United States Patent [19]
Zingher

[11] Patent Number: 6,092,039
[45] Date of Patent: Jul. 18, 2000

[54] SYMBIOTIC AUTOMATIC SPEECH RECOGNITION AND VOCODER

[75] Inventor: Arthur Richard Zingher, White Plains, N.Y.

[73] Assignee: International Business Machines Corporation, Armonk, N.Y.

[21] Appl. No.: 08/960,535

[22] Filed: Oct. 31, 1997

[51] Int. Cl.[7] .................................................. G10L 19/02
[52] U.S. Cl. .......................... 704/221; 704/222; 704/231; 704/203
[58] Field of Search ..................................... 704/203, 204, 704/231–235, 239, 246, 221, 222, 223

[56] References Cited

U.S. PATENT DOCUMENTS

| | | | |
|---|---|---|---|
| 4,707,858 | 11/1987 | Fette ......................................... | 704/251 |
| 5,485,543 | 1/1996 | Aso ........................................ | 704/267 |
| 5,590,242 | 12/1996 | Juang et al. ............................. | 704/245 |
| 5,606,645 | 2/1997 | Matsuura ................................ | 704/256 |
| 5,649,056 | 7/1997 | Nitta ....................................... | 704/256 |
| 5,729,694 | 3/1998 | Holzrichter et al. .................... | 704/256 |

OTHER PUBLICATIONS

Rabiner (Applications of Voice Processing to Telecommunications), Proceeding of the IEEE, vol. 82, No. 2, Feb. 1994.

Imai et al., "A Direct Approximation Technique of Log Magnitude Response for Digital Filters," IEEE Transactions on Acoustics, Speech, and Signal Processing, vol. ASSP–25, No. 2, Apr. 1977.

Imai, "Low Bit Rate Cepstral Vocoder Using the Log Magnitude Approximation Filter," IEEE 1978, pp. 441–444.

Koishida et al., "CELP Coding Based on Mel–Cepstral Analysis," IEEE 1995, pp. 33–36.

*Primary Examiner*—David R. Hudspeth
*Assistant Examiner*—Abul K. Azad
*Attorney, Agent, or Firm*—F. Chau & Associates, LLP

[57] ABSTRACT

The device and method of the invention receives a digital speech signal, which is processed by an Acoustic Processor to produce a Mel-Cepstrum Vector and Pitch. This is recalibrated and encoded. The encoded signal is transmitted over a narrow-band Channel, then decoded, split and recalibrated. From the split signals, one signal feeds a Statistical Processor which produces Recognized Text. Another signal feeds a Regenerator, which produces Regenerated Speech. The device and method according to the invention achieve simultaneously very perceptive Automatic Speech Recognition and high quality VoCoding, using Speech communicated or stored via a Channel with narrow-bandwidth; very perceptive Automatic Speech Recognition on a Client & Server system without a need to store or to communicate wide-bandwidth Speech signals; very perceptive Automatic Speech Recognition with Deferred Review and Editing without storage of wide-bandwidth Speech signals; better feedback in a system for Automatic Speech Recognition particularly for Deferred Automatic Speech Recognition; and good usability for unified Automatic Speech Recognition and VoCoding.

13 Claims, 14 Drawing Sheets

SYMBIOTIC AUTOMATIC SPEECH RECOGNITION AND VOCODER

Related Application Data

The present application is related to a commonly assigned patent application, entitled "Statistical Methods and Apparatus for Pitch Extraction in Speech Recognition, Synthesis and Regeneration", Application No. 08/961,733 filed on even date herewith.

BACKGROUND

1. Technical Field

The present invention relates to a system and method of speech processing; in particular, a symbiotic system and method for Automatic Speech Recognition and VoCoding. Hereinafter, the two functions shall be respectively abbreviated as "ASR" and "VC".

2. Discussion of Related Art

"VoCoding" means speech compression and speech regeneration in the field of speech processing. There exists numerous VC concepts and systems to convey a high quality approximation to human speech for communication over a Channel with very narrow bandwidth or is capable of handling only low data rate.

FIG. 1 shows a simplified view of the prior art of VC and its context. Original Speech Sounds 100 are transformed by a Microphone 102, which feeds an Analogue-To-Digital Converter 104. This produces a signal which includes (hereinafter abbreviated as "Sg") the original PCM 106, which is a wideband digital representation of speech using "Pulse Code Modulation" or PCM. This feeds a Speech Compressor 108, which produces Sg. Compressed Speech 110, which has much narrower bandwidth. This is communicated or stored and recalled via a Channel 120 with limited bandwidth. Upon receipt of the transmitted signal from the Channel, the Compressed Speech 122 feeds a Speech Regenerator. This produces a Sg. Regenerated PCM 124 which approximates the Sg. Original PCM. The Sg. Regenerated PCM feeds a Digital-to-Analogue Converter 126, which produces an analogue signal, which feeds an Amplifier 128, which feeds a Loudspeaker or Earphone 130, which emits Regenerated Speech Sounds 140, which approximates the Original Speech Sound 100.

One very widely used VC family is based on "waveform coding". For example, the Speech Compressor measures the serial correlation vector (auto-correlation vector) in the Sg. Original PCM. This correlation is expressed by a vector of Linear Prediction Coefficients (LPC). Also the Speech Compressor measures a "residual" signal which summarizes information not captured by the LPC. This LPC vector and residual are used in the Compressed Speech. A more complicated version is widely used for cellular telephony under the European standard "GSM-610".

Another very widely used large VC family is based on "sub-band coding". The Speech Compressor analyzes the Sg. Original PCM into a number of frequency bands, and produces a vector containing the spectrum. Also the Speech Compressor measures a "residual" signal which Us summarizes information not captured by this spectrum.

Another VC technique is based on the "Mel-Cepstrum Vector", described in "Cesptral Analysis Synthesis on the Mel Frequency Scale", by S.Imai, in "Proceedings of the International Conference on Acoustics, Speech and Signal Processing, 1983 in Boston" (ICASSP'83), pg 93–96, as published by the IEEE. The disclosure therein is incorporated by reference herein.

In Imai, there is a Sg. Original PCM with about 10 k PCM values/sec. The Feature Extractor processes this as overlapping frames, at the rate of about 100 frame/sec, each containing about 200 PCM values/frame. For each frame, a Fourier Transform produces a Spectrum Vector of complex numbers. Each complex number is transformed by the complex Magnitude Function, followed by the real Logarithm Function. This produces a "Log Spectrum" of about 100 real values. This vector is "warped" to compensate for the non-uniform frequency sensitivity of the human hearing. This warped vector is smoothed, and transformed by the inverse Fourier Transform. This produces a Mel-Cepstrum Vector.

In the system described by Imai, it determines the fundamental pitch for voiced speech. In a parallel with the calculation of the Mel-Cepstral Vector, the Log Spectrum feeds an Inverse Fourier Transform, which produces a "Cepstrum Vector". The frequency of the maximum of this Cepstrum Vector is used to estimate the fundamental Pitch for voiced speech.

This Mel-Cepstrum Vector and Pitch together form the Compressed Speech of the Vocoder described by Imai. This feeds the Regenerator, which includes an Excitation Generator, and a Rapidly Adjustable Filter. The Pitch is fed into Excitation Generator, which produces an Excitation Signal, which drives a Rapidly Adjustable Filter, which produces Regenerated PCM. In a parallel calculation, the Mel-Cepstral Vector is used to adjust a Rapidly Adjustable Filter. This Filter is designed so its transfer function matches the given Mel-Cepstrum Vector. This Filter uses many forward and recursive (FIR and IIR) difference equations. These are based on a Pade' approximation to the exponential function, and based on a Mel-warping operator.

FIG. 2 is a simplified view of a Prior Art Automatic Speech Recognition (ASR) system. The Original Speech Sound 200 feeds a Microphone 202, which feeds an Analogue-To-Digital Converter 204, which produces Sg.Original PCM 206. This feeds a Feature Extractor 208, which produces a Raw Feature Vector 208. This feeds a Middle Processor 212, which produces a Sg. Adjusted Feature Vector 214. This feeds a Statistical Processor for ASR 220, which uses Acoustic Prototypes 222, and uses Linguistic Statistics 224, and uses a Vocabulary List 226. The Statistical Processor 220 produces a corresponding Recognized Text 230, which is shown via a Text Display 232. A User Interface is typically used to control and to monitor the ASR processes. FIG. 3 shows details of a prior art Feature Extractor as used in the IBM Voice Type 3 ASR system. This starts with a Sg. Original PCM 300, which typically has 11 k PCM values/sec. The Feature Extractor processes this as "frame" of 256 successive PCM values. Each second the Feature Extractor processes 100 partly overlapping frames. Each frame feeds a Fast Fourier Transform 302, which produces 304 a vector Fourier Spectrum of 128 complex numbers.

This Fourier Spectrum is transformed by a Magnitude Function 306 to produce a vector of 128 real numbers. This is transformed by Weighted Summation 308 using a constant matrix of Mel-Band Weights 312. These weights correspond to the non-uniform frequency sensitivity of human hearing. Thus is produced a Sg. Mel-Band Linear Vector 312. This feeds a Logarithmic Function 314 to produce a Sg. Mel-Band Logarithmic Vector 316. This is transformed by the Discrete Cosine Transform 318 using a constant matrix of Discrete Cosine coefficients 320. This produces a Sg. Raw Mel-Cepstrum Vector 322.

In FIG. 2, the Prior Art ASR system included a Middle Processor 212. This is shown in more detail in FIG. 4. One input is a Sg. Mel-Cepstrum Vector (MCV) 400. There is a Slope Calculation 405, which measures the change rate. The Slope Calculation linearly combines five consecutive Mel-Cepstrum Vectors, with weights (−2, −1, 0, +1, 2). The result is the Sg. Delta MCV 410.

Next, several consecutive delta vectors are analyzed, preferably five vectors, by another Slope Calculation 420, to produce a Sg. Delta-Delta MCV 425. Then three vectors (400, 410, 425) are concatenated to form a Sg. Tri-MCV 415.

In FIG. 4, another Input is the Sg. Original PCM 435, which feeds a Silence Detector 440. This classifies each frame as Silence or else Intermediate or else Speech. This classification is somewhat sophisticated, considers recently preceding frames, includes a "Finite State Machine", avoids some momentary exceptions, and handles many special cases. This classification controls a Gate 430 which produces a Sg. Adjusted MCV 445. If a frame is NOT Silence, then the Gate copies from the Sg Tri-MCV 415 to the Sg. Adjusted MCV 445. If the frame is Silence, then nothing is copied to the Sg. Adjusted MCV.

The ASR system of FIGS. 2 to 4 includes items for audio input of Raw PCM. This typically includes: a User-Speaker; Sound Waves; a Transducer for audio input, preferably a lip-mounted microphone suitable for noise cancellation; Means to reduce noise, such as a noise-cancellation circuit which works with the Transducer; an optional Amplifier; and an Analogue to Digital Converter or "ADC".

Also ASR system of FIGS. 2 to 4 includes items for audio output of Regenerated PCM. This typically includes: a Digital to Anaolgue Converter of "DAC"; an Amplifier; Means for Audio Output, such as an Earphone or Speaker; Regenerated Sound Waves.

Also ASR system of FIGS. 2 to 4 includes items for visual or audio Display of Recognized Text. This may be a visual Display to show text as visual characters. Alternatively, there may be means to convert Text to Speech (PCM), followed by audio output means to convert this to sound.

PERPLEXITY AND PERCEPTIVENESS IN ASR

For a large corpus of speech, its "lexemic perplexity" is the average number of possible "phones" (speech sounds) which may occur, given information about the preceding speech. Thus speech with variable pronunciation, large vocabulary, flexible grammar has high lexemic perplexity. By contrast, speech with regular pronunciation, small vocabulary, restrictive grammar has low leximic perplexity. Accurate ASR is easy for speech with low lexemic perplexity, and challenging for speech with high lexemic perplexity.

An Automatic Speech Recognition system is "Very Perceptive" if and only if it typically provides accurate recognition for speech with high lexemic perplexity. By contrast, an Automatic Speech Recognition system is "Weakly Perceptive" if it inaccurately recognizes speech with high leximic perplexity. Nevertheless, a weakly perceptive ASR can be useful to recognize a small set of fixed phrases with regular pronunciation.

SUMMARY OF THE INVENTION

The apparatus according to the present invention performs automatic speech recognition (ASR) and vocoding (VC), comprising an Acoustic Processor for transforming a first signal representing original Speech to a second signal having Feature Vectors suitable for ASR; and a channel for conveying the second signal to a regenerator suitable for VC, wherein the regenerator transforms the second signal having feature vectors to a third signal representing regenerated Speech.

The apparatus includes Feature Vectors which are Generalized Cepstrum Vectors suitable for very perceptive Automatic Speech Recognition.

The apparatus also includes Feature Vectors which are Mel-Cepstrum Vectors suitable for very perceptive Automatic Speech Recognition.

The apparatus further includes a user interface distinctively suitable for ASR. The channel is preferably a wireless Communication link, but may also be a conventional telephone line.

The apparatus further includes a statistic al processor for receiving and statistically processing said second signal including feature vectors into recognized text and means for a user to edit the recognized text.

The apparatus further includes a Statistical Processor which transforms the second signal received from the channel to an identification of a Speaker of the original Speech.

The system and method according to this invention achieve simultaneously the following: very perceptive (VP) ASR; high quality VC, using Speech commmnunicated or stored via a Channel with narrow-bandwidth; deferred VP ASR without a need to store wide-bandwidth Speech signals; VP ASR with Deferred Review; Editing without storage of wide-bandwidth Speech signals; better feedback in a system for ASR, particularly for deferred ASR; and good usability for unified ASR and VC.

DESCRIPTION OF PREFERRED EMBODIMENTS

Figure 5:
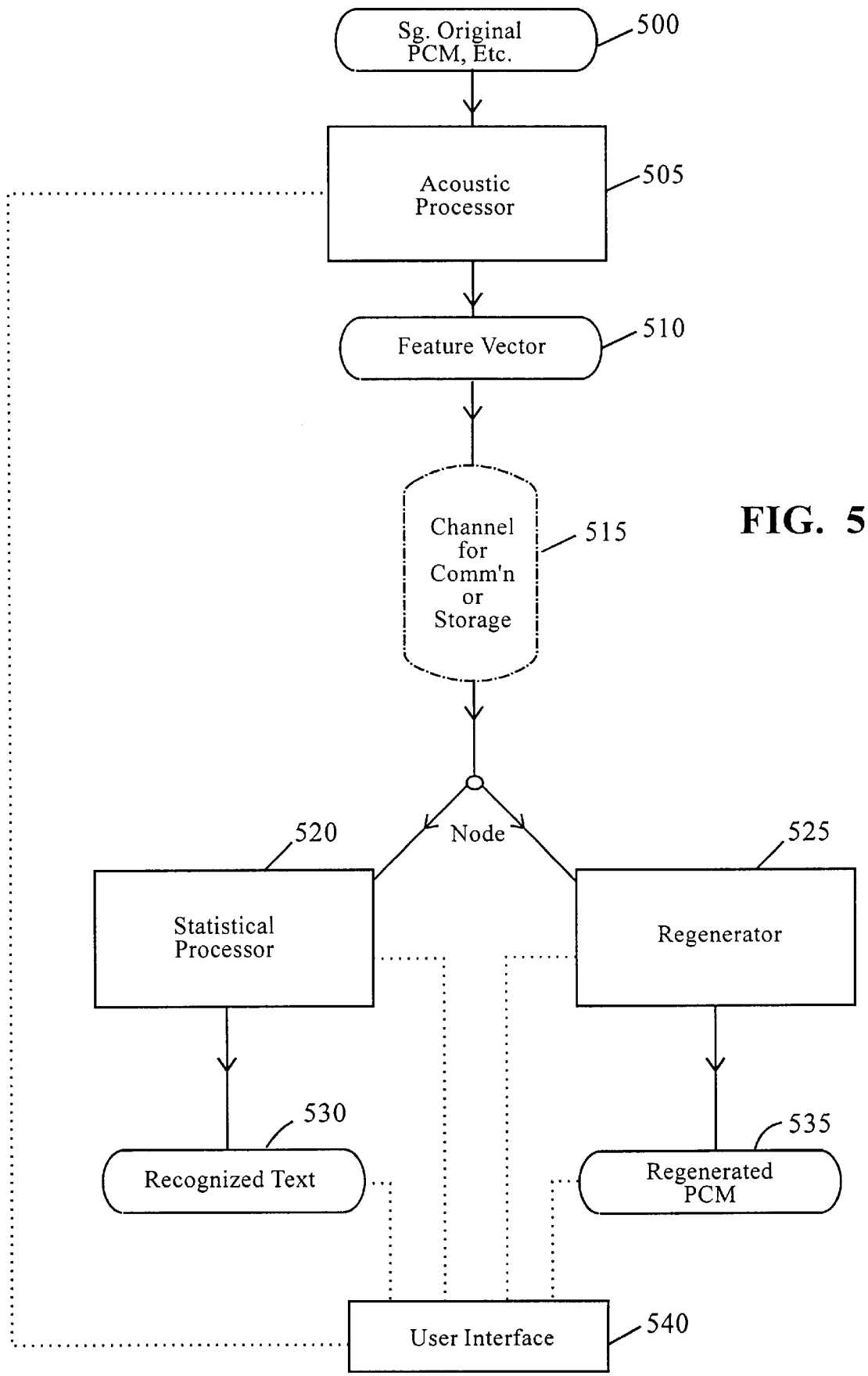
FIG. 5 shows is a system block diagram of the illustrative embodiment of the present invention.

This invention is a synergistic unification of ASR and VC. A simplified view is shown in FIG. 5. This starts with Sg.

Original PCM 500, which feeds an Acoustic Processor 505, which produces Sg. Feature Vectors 510, which has narrow bandwidth. The latter is carried via 515 a Channel for communication and/or for storage, to a Node 516, where the signal is split. A signal feeds a Statistical Processor 520, which produces a corresponding Sg.Recognized Text 530. From the Node, a signal feeds a Regenerator 525, which produces a corresponding Regenerated PCM 535. In addition, to achieve good useability, there is a User Interface 540, which includes controls, indicators, input and output means for the preceding elements.

The illustrative embodiment according to the invention include several advantageous features:

{1} The central concept is to use elements which are simultaneously and compatibly suitable for ASR and VC;

{2} A special vector which both serves as the Compressed Speech for VC, and serves as the Feature Vector for ASR;

{3} A Y-shaped topology to unify ASR and VC. This topology enables unification without added digital noise;

{4} Means for Cross-Calibration of several signals, in order to achieve compatibility between vectors for ASR and vectors for VC;

{5} A structure and method to determine suitable Calibration Constants for Cross-Calibration;

{6} The use of this Cross-Calibration for considerable bandwidth compression, which nevertheless is transparent to ASR;

{7} Adaptation of ASR processes to create specialized VC algorithms which tighten bandwidth and are transparent to ASR, in contrast to classical lossy VC algorithms. Some examples are Silence Coding and Slope Coding;

{8} One or more User Interface feature(s) which improves useability.

This invention describes important synergistic advantages between ASR and VC, e.g., this invention achieves both Very Perceptive Automatic Speech Recognition, and achieves Sg. Regenerated PCM which a User-Listener perceives as a readily understandable and lifelike approximation to the original speech. This is achieved with a narrow Channel, only slightly wider bandwidth than Prior Art VC by itself. Also used is a unified upstream calculation which is only slightly larger than the Feature Extractor for Prior Art ASR. Nevertheless, this invention is highly compatible with the Prior Art Statistical Processor for ASR. These synergistic results are considerably better than the bandwidth sum or computing load sum of ASR and VC done independently.

Figure 6:
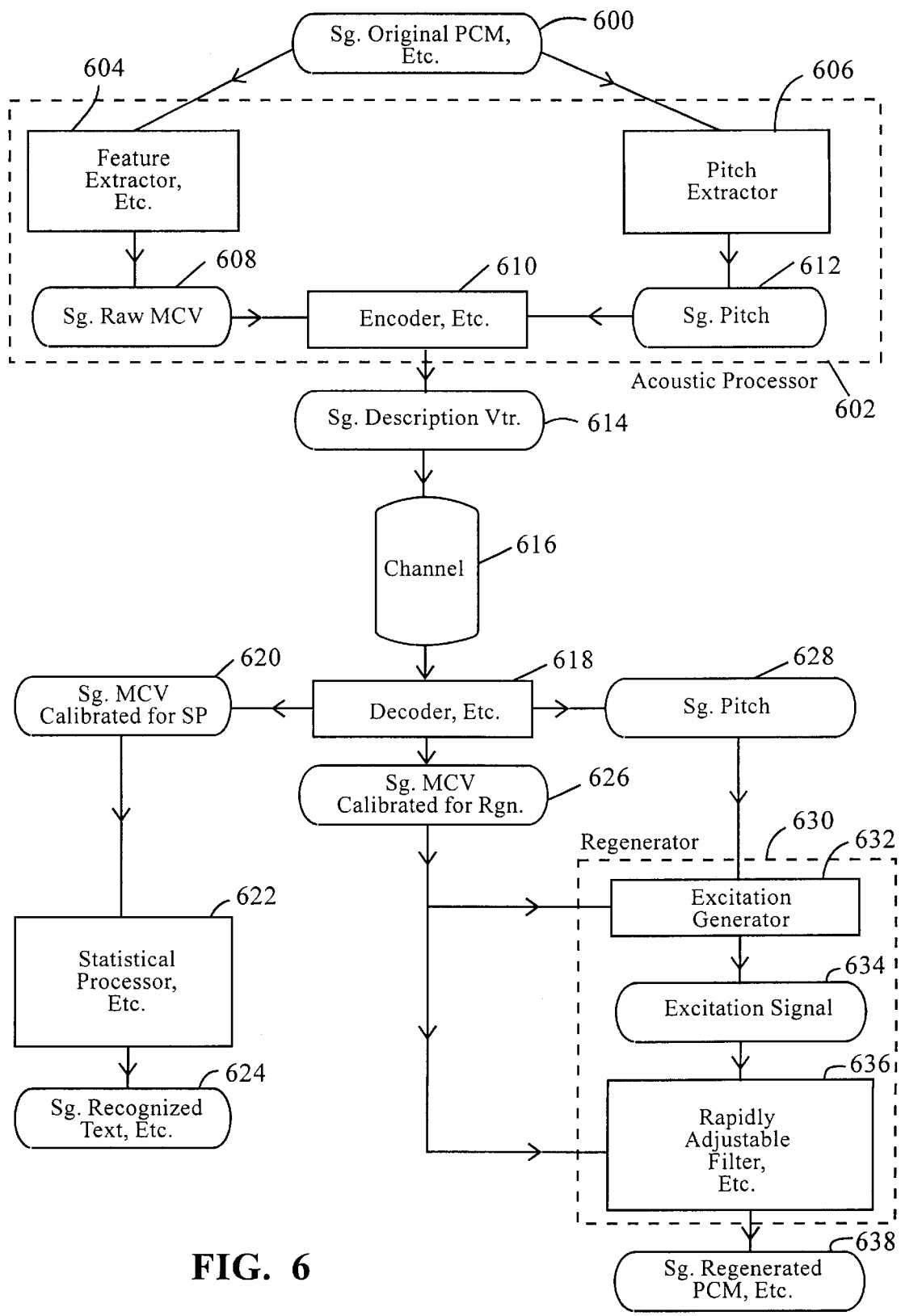
FIG. 6 is another view of the illustrative embodiment of the present invention.

FIG. 6 shows a more complete view of an embodiment. The Sg. Original PCM 600 splits inside "the Acoustic Processor 602. The Sg. Original PCM 600 feeds a Feature Extractor 604 which produces a Mel-Cesptral Vector 608. Also the Sg. Original PCM 600 feeds a Pitch Extractor 606 which produces a Sg.Pitch 612. These two results are combined and encoded by an Encoder 610 which thus produces Sg. Description Vectors 614.

The Description Vector 614 is communicated and/or stored through a Channel 616 to a Decoder 618, which produces several signals. There is a Sg. Mel-Cepstrum Vector calibrated for ASR 620. This feeds into a Statistical Processor 622, which produces a corresponding Recognized Text 624.

Also, the Decoder 618 produces a Sg. Mel-Cepstrum Vector calibrated for VC 626, and a Sg.Pitch 628. These two signals both feed a Regenerator 630, which includes an Excitation Generator 632, and a Rapidly Adjustable Filter 636. The Sg.Pitch 628 and the Sg. Mel-Cepstrum Vector 626 both feed the Excitation Generator 632, which produces a corresponding Excitation Signal 634, which excites the Rapidly Adjustable Filter 636. Also the Sg. Mel-Cepstrum Vector 626 feeds the Rapidly Adjustable Filter 636, and modulates its Transfer Function. Thus the Regenerator produces a Sg. Regenerated PCM 638.

Although the heretofore discussed prior art systems represented advances in the art, nevertheless a need exists for a system which unifies VC and ASR to achieve remote or deferred ASR over a narrow bandwidth channel and to play speech over the narrow channel.

Pitch Extraction and Excitation Generator

Whispered Speech and Monotonic Speech. In one embodiment of this invention, Pitch 628 is NOT extracted, and NOT fed into the Excitation Generator 632. Instead the Excitation Generator produces "white noise" as the Excitation Signal. When fed through the Rapidly Adjustable Filter, this produces Regenerated PCM which resembles natural whispered speech, which is quite intelligible for English. For Monotonic Speech, an Excitation Signal is generated with constant Pitch. These whispered or monotonic styles are understandable, they are NOT adequately "natural-sounding".

Pitch, VC and ASR

In all spoken human languages, Pitch is quite necessary for natural-sounding speech. In a preferred embodiment, Pitch is extracted by the Acoustic Processor 602 and used by the Regenerator 630. For ASR in many Asian languages relative pitch ("tone") is quite important for word identification, and is a useful input for the Statistical Processor for ASR. For present-day ASR of European languages, pitch contributes little information relevant to word identification, and need not be used by the Statistical Processor.

Pitch Extraction

There are many known techniques of pitch extraction. One embodiment of this invention uses the "Auto Correlation method". This starts with the Original PCM, constructs its Auto Correlation vector, and determines the lag-time of the peak of the Auto Correlation. This lag time is used to determine the Pitch. For example see "Fundamentals of Speech Recognition" by L.Rabiner and B. W. Juang (Prentice Hall Publishers, 1993).

Voiced and Unvoiced Excitation

Speech includes voiced segments with distinct Pitch, and unvoiced segments without distinct Pitch. Therefore the Excitation Generator 632 includes means to produce both modes, and means to modulate between them. For example, excitation based on Text to Speech is described by Dennis H. Klatt ("Review of text-to-speech conversion for English" in J.Acoust.Soc.Am., Vol. 82, No. 3, 1987 Sept., pg 737–793) and described by G. Fant ("Some problems in voice source analysis" in "Speech Communication", Vol. 13, pg 7–22, Publ. North-Holland, 1993). For an unvoiced Excitation Signal, Klatt used "white noise" from a random number generator. For a voiced Excitation Signal, Klatt used an unsymmetrical periodic waveshape, shaped approximately like the dorsal fin of a shark.

An illustrative embodiment of the present invention uses a periodic train of narrow rectangular pulses for the purely unvoiced Excitation Signal, and white noise for purely unvoiced Excitation Signal. The Excitation Generator 632 identifies voiced and unvoiced speech, and makes a corresponding change in the Excitation Signal. The Mel-Cepstral Vector, particularly MC[0] and MC[1], implicitly identifies voiced vs unvoiced modes. MC[0] conveys the overall acoustic power. MC[1] conveys the ratio between acoustic power at higher frequencies versus acoustic power at lower frequencies. Voiced speech typically has relatively large overall acoustic power, concentrated at lower frequencies. Unvoiced speech typically has relatively low acoustic power, spread approximately uniformly across the frequency spectrum. The Excitation Generator tests these MC coefficients and produces a corresponding Excitation Signal.

Residual Signals

For Regenerated PCM with a more natural sound, it is important to convey sound properties inadequately described by the Pitch and Mel-Cepstrum Vector. It is particularly necessary to improve the parameters which control the Excitation Generator. According to the present invention, components for more sophisticated VC are unified with ASR. Thus the Pitch Signal is superseded by a more detailed Residual Signal.

Figure 7:
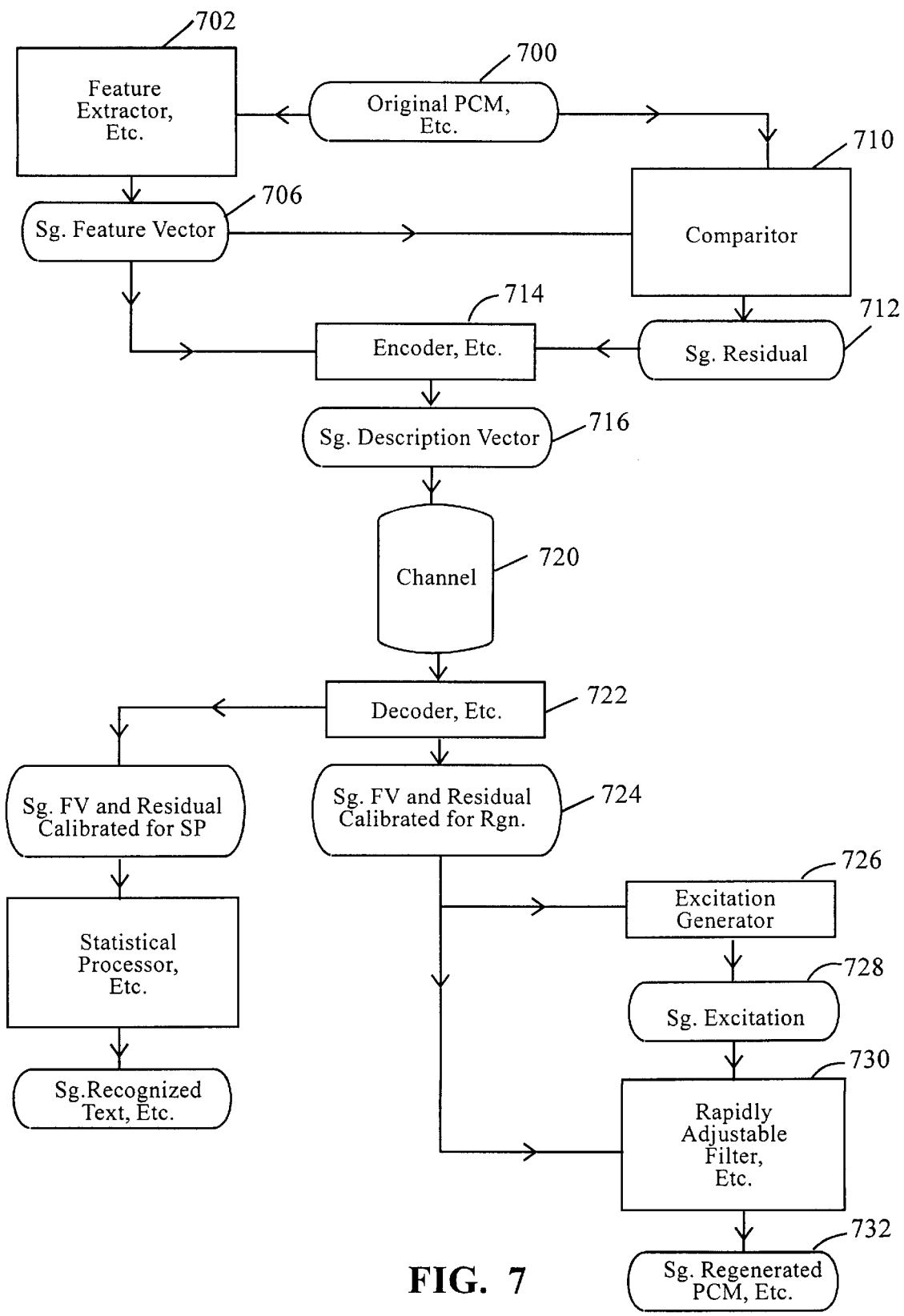
FIG. 7 shows a feature vector and residual usage according to the illustrative embodiment of the present invention.

Referring to FIG. 7, an Embodiment using a Residual, the Feature Extractor 702 produces Sg. Feature Vector 706. There is a Comparitor 710 which is fed by the Sg. Original PCM and fed by the Sg. Feature Vector 706. The Comparitor 710 compares these two signals, and approximately summarizes their difference as a Sg. Residual 712, with a relatively small bandwidth. This also feeds the Encoder 714. The Encoder combines and encodes its inputs into a compressed Sg. Description Vector 716.

Preferably, the Comparitor 710 determines the Residual signal which, together with the Feature Vector, forms the best approximation to the Original PCM.

The Sg. Description Vector 716 is conveyed by a Channel 720 for communication or storage to a Decoder 722. This translates the Sg.Description Vector into a Sg.Feature Vector and Residual which are calibrated for VC 724. This feeds into a Regenerator which includes an Excitation Generator 726 and a Rapidly Adjustable Filter 730. The Excitation Generator produces an Excitation Signal 728 which excites a Rapidly Adjustable Filter 730. Also Sg. Feature Vector 724 is also fed into Filter 730, and modulates its Transfer Function to produce Sg. Regenerated PCM 732.

Various Kinds of Residuals

Bishnu Atal and Joel Remde describe "A New Model of LPC Excitation for Producing Natural-Sounding Speech at Low Bit Rates", at pg 614–617 of "Proceedings of the 1982 ICASSP International Conference of Acoustics, Speech and Signal Processing", published by IEEE, as CH 1746-7/82). The Original PCM is analyzed into a Filter, parameterized by a Feature Vector, and analyzed into a sequence of narrow excitation pulses. For each excitation pulse, its amplitude and timing are individually measured, transmitted, and regenerated. This is often referred to as a "Multipulse Vocoder".

A MELP Mixed Excitation Linear Prediction Vocoder, developed by A.McCree, E. B. George, V. Viswanathain, at Texas Instruments Personal System Lab, and by K.Truong and T.Barnwell at Atlanta Signal Processors Inc. analyzes the Original PCM into Linear Parameters (corresponding to a Filter) and an Excitation Signal. The excitation is parameterized by plural "codes". These refer to code-books which describe the corresponding excitation. They described this in "A 2.4 Kbit/sec MELP Coder . . . " in the ICASSP 1996 Processings, pg 200–203, published by the IEEE as ISBN 0-7803-3192-3/96. These Residual articles used Linear Prediction Coefficients (LPC) in the Compressed Speech. By contrast, LPC is considerably less favored for ASR.

Kinds of Feature Vectors Suitable for Very Perceptive ASR

Some kinds of Feature Vectors are suitable for weakly perceptive ASR, but are not suitable for very perceptive ASR. For example, many crude kinds of Feature Vectors are suitable to recognize "yes" versus "no" with regular pronunciation.

Some kinds of Feature Vectors are suitable for weakly or moderately perceptive ASR, but less suitable or not suitable for very perceptive ASR. This may be a result of unfavorable parameters or unfavorable lossy encoding, rather than a fundamental defect of Feature Vector.

Thus, given a proposed Feature Vector, it is meaningful to consider its suitability for highly perceptive ASR.

Kinds of Feature Vectors Suitable for this Invention

An illustrative embodiment of this invention uses a Mel-Cepstrum Vector, calculated via the Fast Fourier Transform, and augmented by a Pitch or a Residual signal.

The following approaches in deriving feature vectors are suitable for additional embodiments of the present invention:

LPC GCV Generalized-Cepstrum Vector Calculated via Linear Prediction Coefficent

This starts with the Original PCM signal, and calculates the Auto-Correlation Vector. This is mathematically transformed into LPC Linear Prediction Coefficients which correlate from earlier values of the Original PCM to a later value of the Original PCM. These LPC values are transformed into a Fourier Power Spectrum. This is transformed into the Mel-Band Magnitude Vector, then into the Mel-Band Logarithm Vector. The latter is transformed by the Discrete Cosine Transform into the Mel-Cepstrum Vector, as derived from LPC.

WT GCV Generalized-Cepstrum Vector calculated via Wavelet Transform

A Wavelet Transform is used in lieu of a Fourier Transform to directly calculate a spectrum vector or "periodogram" with non-uniform frequency resolution (similar to a Mel-Band Vector) and non-uniform time resolution (finer time resolution in the wider bands). This offers better resolution of rapid changes in the Original PCM. Next, from the periodgram, take the logarithm of the magnitude of each coefficient. Finally transform by matrix rotation to form a Generalized-Cepstrum Vector.

Various Mel-Like Compensations

The human ear has non-uniform frequency resolution It is desirable that the Feature Vector compensate for this non-uniformity. Compensation techniques include Mel-bands or Bark-bands measured by different perceptual studies, include discrete Mel bands or continuous Mel warping, include various algebraic parameterizations, such as logarithms or fractional-power functions. Each leads to slightly different Generalized-Cepstrum Vectors.

LDA GCV Generalized-Cepstrum Vector calculated via Linear Discriminant Analysis

This Vector is calculated by a multiplying the Mel-Band Logarithm Vector by a training matrix. This training matrix is constructed to optimize discrimination between various speech sounds in prior training data.

NNT FV Feature Vector Via Neural Network Training

This uses a simulated Neural Network which is "trained" to optimized discrimination between various samples of speech sounds.

PLP FV Perceptual Linear Prediction Feature Vector

This Feature Vector further emphasizes compensation for several non-linearities in human audio perception. The Original PCM is analyzed by the Fourier Transform, which leads to a Magnitude Spectrum. Then spectrum components are clustered into a Critical Band Magnitude Vector. This clustering compensates for non-linear frequency resolution of human perception. Then each Critical Band Magnitude is rescaled (preemphasized) to compensate for non-uniform sensitivity of human perception. The resulting Rescaled Magnitude is transformed by a ⅓ power formula, to form a Perceived Loudness. This ⅓ power formula parameterizes the relation from physical intensity to perceived loudness, and is an alternative to the logarithm used for the Mel-Cepstral Vector. Next, the Perceived Loudness Vector is approximated by an All-Pole Model, using an auto-regression calculation.

AN FV Auditory Nerve Feature Vectors

This analysis transforms the Original PCM into a spectrogram of magnitude versus frequency and time, similar to the scalogram of Wavelet analysis. Then use the logarithmic function, and a matrix rotation to form a Feature Vector. See, I.Daubechies and S.Maes in "A Nonlinear Squeezing of the Continuous Wavelet Transform Based on Auditory Nerve Models", published in "Wavelets in Medicine and Biology", A.Aldroubi and M.Unser, CRC Press 1996, and __Auditory models and human performances in tasks related to speech coding and speech recognition", IEEE Trans. Speech Audio Proc., Vol 2, No. 1, pg 115–132 (1994), by O. Ghitza.

Generalized Cepstrum Vector

Many of these Feature Vectors can be summarized or approximated as follows. Start with the Original PCM signal. Use a linear or quadratic vector transformation to form a linear or quadratic spectrum vector. Optionally take the magnitude or real part or imaginary part of each components of this spectrum. Optionally apply a matrix-vector process to compensate for non-uniform frequency resolution. Then apply a compression function, which transforms at least one component by a sub-linear function (ie: a functions whose output increases less than linearly as the input increases). Finally apply a matrix-vector rotation process.

Automatic Speaker Identification (ASI)

A system for Automatic Speaker Identification (abbreviated "ASI") takes in Sg. Original PCM and identifies who is speaking. Some ASI systems try to recognize the speaker voice timbre, independently of the text. Other ASI systems require the user to say a special text. Depending on the application, the "Speaker Identification" may be the name of a specific speaker, or the probabilility the Original PCM matches some possible identification, or a list of possible speakers and probabilities.

The device and method of the present invention is applicable to a synergistic combination of Automatic Speaker Identification, Automatic Speaker Recognition, and VoCoding. Consider a conference which has plural User-Speakers sharing a microphone. The system could produce a transcript which indicates the speaker of each utterance. Also ASI could identify the momentary speaker, and hence help customize ASR to each individual speaker.

Figure 8:
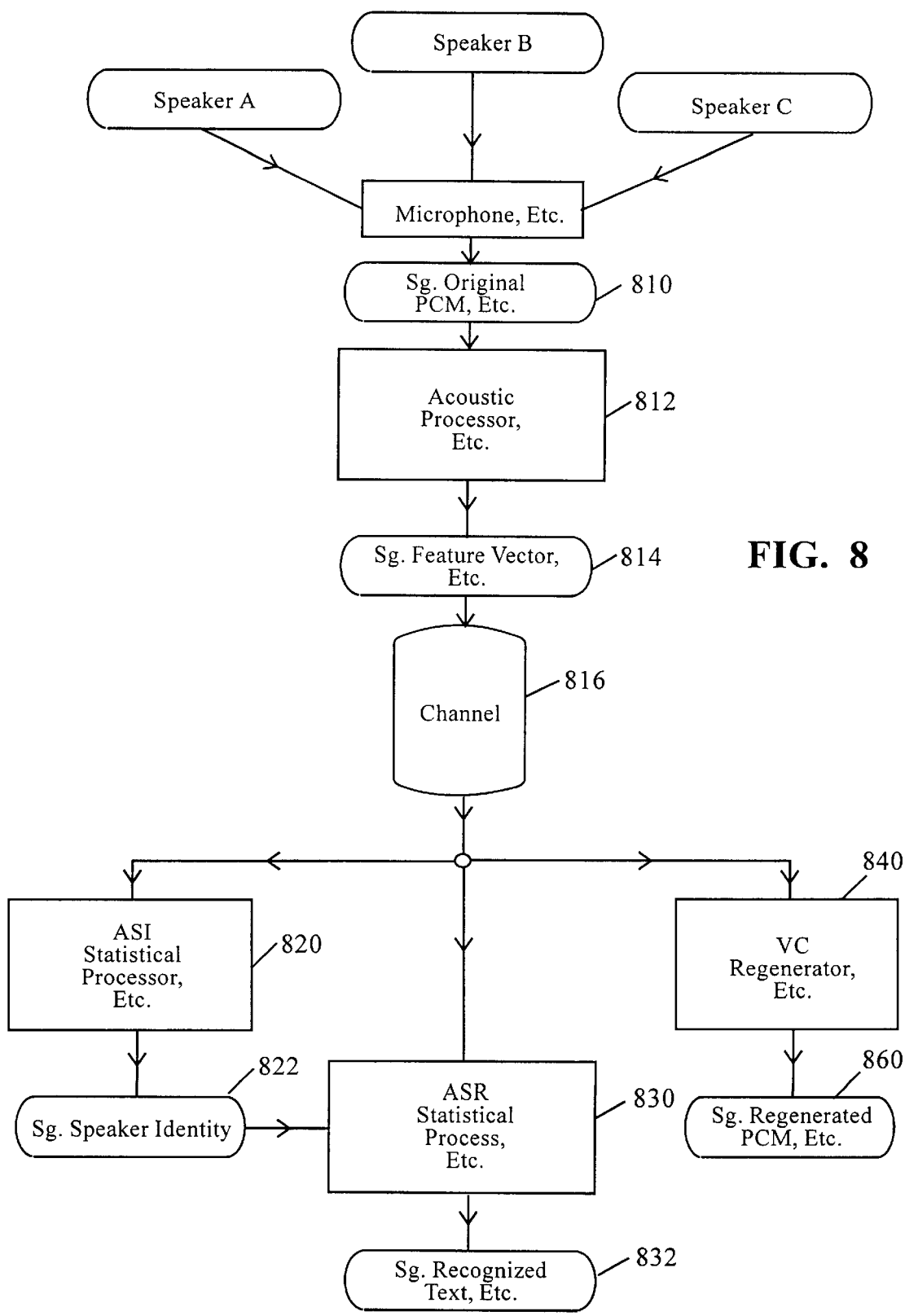
FIG. 8 is a block diagram of an automatic speaker identification system according to the present invention.

FIG. 8 shows a simplified view of an embodiment. There are plural User-Speakers. These jointly produce a Sg. Original PCM 810. This feeds an Acoustic Processor 812 which produces a corresponding Sg. Feature Vector 814. This feeds a Channel 816 for storage or communication.

At the other end of the channel 816, there is a Node 817 which feeds three subsystems, for ASI, ASR, VC. First, the Sg. Feature Vector feeds a Statistical Processor for ASI 820, which produces a Sg. Speaker Identity 822. Also, the Sg. Feature Vector feeds a Statistical Processor for ASR 830. In addition, the Sg. Speaker Identity 822 feeds the Statistical Processor for ASR 830. This Sg. Speaker Identity is used to customize the ASR to each speaker, and to produce Recognized Text 832 including Speaker Identity. Third, the Sg.Feature Vectors feeds a Regenerator for VC 840 which produces Regenerated PCM 860.

Client & Server Embodiment with Storage on Client

Figure 9:
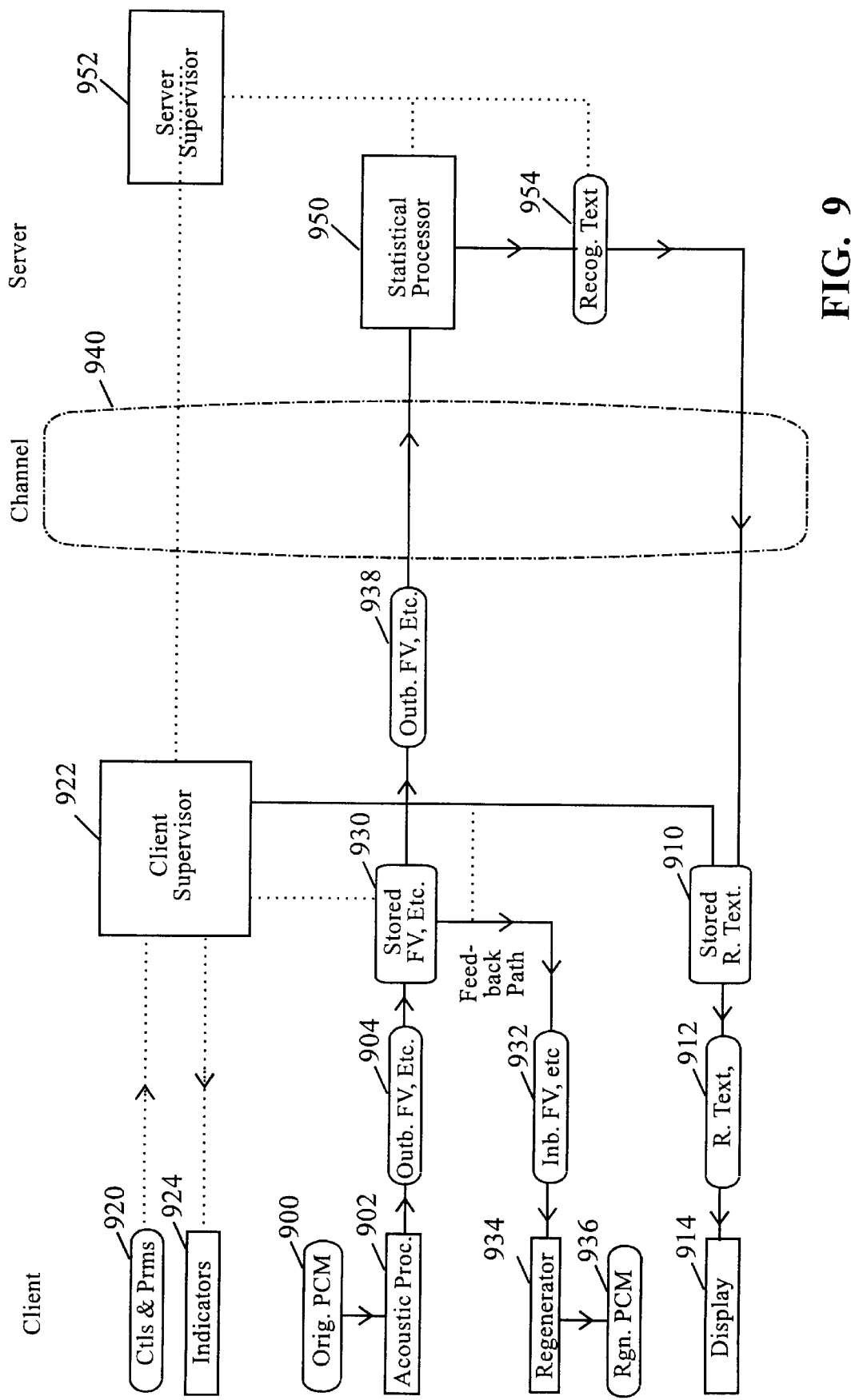
FIG. 9 shows a client/server based embodiment of the present invention.

FIG. 9 is a simplified view of an embodiment with a Client, a Channel, and a Server. A Client is typically a computer with relatively limited resources. A Server is typically a computer with stronger resources. In the Client, there is Sg. Original PCM 900, which feeds an Acoustic Processor 902. This produces an Outbound Feature Vector 904, which feeds into a Stored Feature Vector 930. This same storage can emit an Inbound Feature Vector 932 which feeds a Regenerator 934, which produces a Regenerated PCM 936. Also there is Storage for Text 910 and a Display 914. This may be visual display, or may use Text-To-Speech for an audio display.

In the Client, there are user interfaces such as inputs for Controls and Parameters 920, which feed a Client Supervisor 922. These inputs may use internally stored values, buttons, a pen, a tablet, a mouse, keyboard, or on-board means for weakly perceptive ASR. Also the Client Supervisor 922 can send signals to various Indicators or Displays 924. These may use various binary indicators, or a screen with icons, or a screen for text and some graphics. Also the Client Supervisor 922 can control the Stored Feature Vector 930 and the Stored Recognized Text 910.

The Client can calculate and store Feature Vectors and can calculate Regenerated PCM. Thus the Client can effectively compress, store and regenerate Speech. In a Preferred Embodiment, the Client supports some text editing, using the Controls and Parameters 920, Client Supervisor 922, Stored Text 910 and Display 914. The Client supports on-board means for weak ASR, such as navigation, spoken command and control, or spelled speech. Thus spoken commands and spelled speech may be used for inputs for text editing.

In embodiments in which the Client has limited memory and processing speed, the Client cannot support self-contained very perceptive ASR. Remote ASR may then be used. The Client uses a Channel 940 to communicate with a Server. This has much greater resources, including a Statistical Processor 950 for ASR, and a Server Supervisor 952. The Channel preferably employs wireless communication, including a link using radio waves, or microwave radiation, or infrared radiation, or visible light, using analogue or digital or other means to carry a signal, using one-to-one connection, or a network connection. Some examples are a digital radio link, a cellular telephone link, an infrared data link. The Channel 940 may also include wire-line means for communication.

During Remote ASR operation, Stored Feature Vectors sends Outbound Feature Vectors 938 to the Statistical Processor 950. This produces a corresponding Recognized Text 954 which is communicated back to the Client, to its Stored Text 910, and hence to the client's Display 914.

The client's display includes means for a User to select some of the Recognized Text 912 capability for the Client to recall corresponding Stored Feature Vectors 930; and for a Regenerator to calculate and to emit corresponding Regenerated PCM. Thus there are capabilities for review and editing of the Recognized Text 912 and Regenerated PCM.936. It is readily apparent that speech recording, Remote ASR, and review and editing can all be done withOUT storing the wide-band Sg. Original PCM, and withOUT communicating this wide-band signal between Client and Server. Thus large-capacity storage and wide-bandwidth communication are NOT necessary.

In this embodiment, the Client includes a User Interface and Automated Interface with Distinctive Features aimed at very perceptive ASR. These higher-features are carried by lower-level components visible in FIG. 9. In the Client, these User Interface with Distinctive Features is carried by the Controls and Parameters 920, Indicators and Displays 924, the Display 914 for the Recognized Text 912, and the Client Supervisor 922. The Automated Interface with Distinctive Features is carried by the signals which cross the Channel 940. These Distinctive Interface features are described more completely in another section of this invention. Conversely, the presence of one or more Distinctive Feature(s) in the User Interface or Automated Interface, helps to indicate that ASR is supported.

Implementation of the Client may be by a palm-top computer, or sub-laptop computer, or very modest notebook computer. The Channel can be a "sneaker-net" intermittent or sustained connection between Client and Server, a telephone channel with modem connections, or a specialized network connection.

Deferred ASR refers to an embodiment where the Feature Vectors are stored on the Client, and there is a deferred or intermittent Channel connection to the Server, which extracts the Recognized Text.

An ultra-portable digital audio unit provides a somewhat different example. For example, this can use flash memory for solid-state storage, and support audio recording, storage and playback of a lot of compressed speech, or a little uncompressed speech, and provide a connection for a Channel. If the visual display or input device (eg: keyboard) is inadequate, review and correction may be deferred until it can be done on a larger unit. Another approach is to us e Text-To-Speech for audio display of the Recognized Text in the Stored Text, or use self-contained means. for weak ASR.

Preferably, the average bandwidth of the Feature Vector is about 3.25 kbits/sec=0.406 kBytes/sec. Thus an hour of Speech would fit in only 1.46 MegaBytes. Therefore an inexpensive flash-memory can hold a useful and considerable amount of Feature Vectors. Also, a tiny hard disk drive can hold the equivalent of many hours of speech.

The Channel 940 can be a telephone system with modem. A benchmark rate is 64 kbits/sec=480 kBytes/minute=28.8 MegaBytes/hour. At this rate, 1.46 MegaBytes can be communicated in 3.04 minutes.

Thus Remote ASR or Deferred ASR is quite attractive. Although the Client may be quite economical and portable, it provides useful self-contained functions, and indirectly provides more powerful functions via Channel and Server.

Novel Feedback for Better ASR and VC

Sometimes, an inexperienced User finds it difficult to achieve very perceptive ASR. Often there is an unperceived problem with the microphone, acoustic noise or electronic noise. The Prior Art of User Interfaces for ASR provides feedback by recording and replaying the Original PCM. Unfortunately, that feedback is FAR FROM RELIBLE. Human speech recognition is quite different from ASR. In many cases, even though an inexperienced user can clearly understand replayed Original PCM, nevertheless it contains noise which severely degrades ASR.

In a scenario where speech is recorded for Deferred ASR, this problem may be greatly aggravated. An inexperienced User may record a lot of speech, then later discover it is NOT suitable for VP ASR.

Another advantage of this invention is better feedback for ASR. In FIG. 9, consider the Client with Stored Feature Vectors 930. At the beginning of a session, the User ought to speak a brief sample of Speech. The system produces Sg. Feature Vectors, which are stored. There is a Feedback Path 931 to Regenerator 934. Thus the User can listen to the corresponding Sg. Regenerated PCM 936. The same Feature Vectors are used for ASR and VC. Therefore clarity or unclarity of the Regenerated PCM 936 is strongly correlated with accuracy or inaccuracy of the Recognized Text 954, 910, 912.

In some cases (eg: journalism), one person is the Speaker, and another person is the Operator for the the system. This leads to a pipeline scenario, with almost simultaneous speaking (by the Speaker) and listening (by the Operator). The system converts the Speaker's sounds into Sg. Feature Vectors, which is promptly converted to Sg. Regenerated PCM 934, which is heard by the Operator. This feedback helps the Operator to evaluate the suitability of the Speech, and hence to make changes if they are indicated.

For very perceptive ASR, this sample Regenerated PCM ought to sound like clear speech. If the Regenerated PCM sounds unclear, then there is an upstream problem, such as acoustic noise, an unfavorable location for the microphone, microphone malfunction, electronic noise, microphone problems, defective Acoustic Processor, etc.

The Feedback Feature is particularly useful for several reasons. In a scenario of Deferred ASR, this feedback can be done when the speech is recorded, before the speech is recognized. This Feedback Feature can be done entirely on the Client, even when the Server is not currently available. If there is some problem with ASR, this Feedback Feature can help to determine its location. This Feedback Feature also can be used to improve VC functions.

This invention teaches how to regenerate speech from a signal which includes Features Vectors. The section "Pitch Extraction and Excitation Generation", and the section "Residual Signals", describe how Pitch and/or additional Residual data may be included, to produce Regenerated Speech which sounds more "natural". Thus the Regenerator may use Feature Vectors plus a portion of Residuals.

In the prior art of vocoders, by using Residuals with greater data-rate, then the audio quality of the regenerated speech is improved. Therefore, those systems generally use Residuals with relatively large data-rate.

In contrast, when this invention is used for a preview of recognizibility, the Residual has an undesired effect. Since the Residual signal is used by the Regenerator, and not used by the ASR, the Residual weakens the correlation between the clarity of the Regenerated Speech and the accuracy of the Recognized Text produced by ASR.

When this invention regenerates speech for a preview of recognizibility, the regenerator ought to use none or little of the Residual data. More quantitatively, the data-rate of this portion of Residuals used by the Regenerator ought to be less than the data-rate of the Feature Vectors used by the Regenerator. In the preferred embodiment, use only the Pitch and Feature Vectors for regeneration. This provides both adequate "naturalness", and provides useful correlation between clarity and ASR accuracy.

Distinctive Interface Features

Interface between User and System

The usability of a computer or communication subsystem often depends critically on the logical features of the "User Interface" (abbreviated UI). These help a User interact with the subsystem functions. A UI typically uses controls, indicators and displays, input and ouput devices, and guidance messages. Nevertheless, the UI is better described by its logical features.

Some UI features are relevant to many subsystems. (eg: On a laptop computer, the on/off switch applies to almost all subsystems.) By contrast, some UI features are quite distinctive for a particular subsystem.

Certain User Interface features are important for very perceptive Automatic Speech Recognition. By contrast, these features are not necessary for weakly perceptive Automatic Speech Recognition, and are irrelevant or meaningless for sound recording, storage and playback independent of ASR (eg: recording music or speech as unrecognized sound). Such features shall be described as "User Interface Features aimed at very perceptive ASR". These include:

Means to specify parameters to optimize ASR. The parameters include those which specify Acoustic Properties which effect the Original PCM, Speaker Identity, National Language, Language Dialect, Speech Domain, Criterion for Recognition/Rejection and summarizes other Parameters to optimize ASR.

Means to guide a User-Speaker to speech favorable for ASR include Indicator of noise level, signal versus noise, ASR ambiguity versus certainty, ASR correctness versus incorrectness, and further indicators of speech clarity.

Means to manage Lists for ASR including Means to add words and pronounciations and Means to correct or remove words or pronounciations.

Means for a User-Editor to Review and Edit/Correct the results of ASR including Means to display of the Recognized Text, Means to select some of the Recognized Text, Means to hear the Regenerated PCM corresponding to selected Recognized Text, and Means to edit/correct Recognized Text.

Documentation which explicitly guides a User to efficiently use ASR including On-line documentation which explicitly guides a User to efficiently use ASR, and Off-line documentation which explicitly guides a User to efficiently use ASR.

The preferred embodiment includes all these features. These features are distinctive for ASR. Therefore a Client which includes one or more of these distinctive features indicates the Client is "aimed at very perceptive ASR". Likewise a Server which includes one or more of these features indicated the Server is "aimed at very perceptive ASR". A System with one or more of these features indicates the System "aimed at very perceptive ASR".

Interface between Client and Server

In a Client-Server system, there is an automated interface between the Client and the Server. To enable interuserability between various Clients and various Servers, this Client-Server Interface ought obey a Standard. Interuseability further requires the Standard to define the formats and meaning of various signals. Some signals are important for ASR, but are irrelevant or meaningless in the absence of ASR.

Such signals will be described as "Automatic Interface Features aimed at very perceptive ASR". These include Parameter(s) to optimize ASR (Client to Server); Sg. Description Vector or Sg. Feature Vector, Etc. (Client to Server); Recognized Text corresponding to the above signal (Server to Client); Measurement(s) of ASR performance (Server to Client); Message(s) which describe ASR function (Bidirectional); and Signals which coordinate ASR on Client and Server (Bidirectional).

The preferred embodiment includes all these features. The Standard declares the meaning of these signals, and these signals are distinctive for ASR. Therefore a Client which includes one or more of these distinctive features indicates the Client is "aimed at very perceptive ASR". Likewise one may recognize a Server or System which is "aimed at very perceptive ASR".

In this invention, let the phrase "an Interface Feature" be understood to mean "a User Interface Feature or an Automated Interface Feature".

Parameters to optimize ASR performance

These include Acoustic Properties of the Microphone; Acoustic Properties of the Room; Speaker Identity; National Language; Language Dialect (Optional but desirable); Speech Domain (Optional but desirable); Criterion for Recognition/Rejection; and Parameter which summarizes other Parameters to optimize ASR.

The IBM Voice Type 3 ASR system uses these parameters as follows. The Acoustic Properties and Speaker Identity are used to adapt, to select and/or to train customized Acoustic Prototypes. These enable more accurate ASR. By contrast, Acoustic Prototypes recorded with a different microphone, room, or speaker often lead to reduced accuracy for ASR. This improvement does NOT require the User to understand the spectral properties of the microphone, the room, or the Speaker's voice. Instead it sufficient:for the Parameters to indicate a specific, consistent microphone, room, speaker. Thus "Room 219", "Andrea Microphone", "Speaker Bob" would be adequate.

The National Language, Language Dialect and Speech Domain are used to select and/or to train customized Linguistic Tables. The Domain provides specialized vocabulary, specialized grammar, specialized style. Some Domain examples are: medical, legal, financial, engineering, travel, child. When done correctly, this customization significantly improves accuracy for ASR, particularly for high perpelxity speech.

By contrast, if these parameters are absent, then the system defaults to a less customized mode. In many cases, this default mode significantly reduces the accuracy of ASR. Also, if the system uses narrow parameters which mismatch the speech, the accuracy will be reduced.

In almost all cases, it is desirable to achieve very accurate ASR. Inside a Statistical Processor for ASR, potential recognized words range from clearly correct, through ambigious, to clearly incorrect. Depending on the scenario, it may be more important to maximize the fraction of correct words, or to minimize the fraction of incorrect words, or to minimize processing time. The Criterion for Recognition / Recognition directs the Statistical Processor to relevant behavior.

In the preferred embodiment, these ASR Component Parameters for a particular User are encapsulated into a User Profile, which is identified by a brief Summary Parameter. In simple cases, the User Identity may be used as the Summary Parameter. Thus, specification or communiation of this Summary Parameter is implies specification or communication of these ASR Component Parameters. However, when the Speech changes, a component Parameter ought to be specified, commicated or changed.

Means to Guide a User to Speech Suitable for ASR

These Means may be considered ASR feedback indicators. These include Indicator of measured noise level; Indicator of measured signal versus noise; Indicator of ASR ambiguity versus certainity; Indicator of ASR accuracy versus inaccuracy; and Further indicators of speech clarity.

The measured noise level may be embodied as the measured signal level during an interval which the Silence Detector classifies as Silence. The measured signal level may be embodied as the measured signal level during intervals which the Silence Detector classifies as Speech.

When the Statistical Processor processes the Feature Vectors, Etc., and produces Recognized Text, the system ought to count how many words which are more certain, and words are less certain.

When the user does Review and Correction, the system ought to count the number of unchanged words and the number of changed words. Presumably these correspond to correct and incorrect words.

These indicators guide a User to speech faorable for ASR, and warn a User away from Speech unfavorable for ASR. These Indicators are particularly helpful to a User without adequate ASR experience, or with an unfamilar acoustic environment. Without these indicators, poor quality ASR becomes much more probable. However these indicators are irrelevant or meaningless in the absence of ASR. Thus these indicators are distinctive for ASR.

The system may include further indicators of speech clarity. For example, in some IBM systems for ASR of "isolated/discrete words", there is a "Dictation Trainer" feature. This measures the "envelope" of the Original PCM, and this indicates whether or not words are adequately isolated/discrete.

Means to Manage Lists for ASR

For very perceptive ASR, it is important to manage the Acoustic Prototypes List, Linguistic Statistics List, Vocabulary List. There must be corresponding Features in the User Interface to enable theses User management functions. One example is an Interface Feature for the User to add new words or new pronounciations. Another is Interface Feature for the User to review and to delete unwanted words or pronounciations.

Also, the system to selects the most relevant customized Lists based on Parameters which specify the Speaker Identity, National Language, Language Domain, Speech Dialect.

Means for a User to Review and to Edit of the Results of ASR

For high perplexity speech, and realistic Automatic Speech Recognition, the Recognized Text will have often words which are incorrect, uncertain or ambiguous. Therefore, the User ought to review the Recognized Text, and selectively Review the corresponding Regenerated PCM, and to edit the Recognized Text. (Often this is summarized as "Review and Correction")

Therefore the User Interface ought to provide Means to Review and to Edit. This includes Mean s to Display a Recognized Text; Means for a User to select some of the Recognized Text; Means for a User to hear the Regenerated PCM corresponding to selected Recognized Text; and Means for a User to edit a Recognized Text, especially to replace words.

The Means to display of the Recognized Text may be a visual display of text characters, or an audio display via text-to-speech synthesis. The Means to edit recognized text may use a keyboard, or use a mouse, or use ASR of spelled speech, or use ASR of isolated word(s), or ASR of a few words, etc.

Deferred Versus Interruptive Review and Editing/Correction

Very perceptive ASR strongly requires Review and Editing/Correction. This might be done during interruptions in the Speech, or else deferred until after the Speech.

Some scenarios tolerate interruptive editing/corrections. These use real-time ASR, and requires a Speaker tolerant of interruptions. One example is a businessman, who is working alone, using a self-contained ASR desktop system.

Some scenarios demand deferred mode review and editing/correction. If a Speaker canNOT Us tolerate interruptions, then Review and Editing/Correction must be deferred. An example is a Speaker in front of an important audience. If ASR is deferred, then Review and Editing/Correction must be deferred. An example is a portable Client, with limited resources, and with intermittent connection to an ASR Server.

Deferred operation requires storage of (the equivalent of) a large amount of speech. Thus VC aspects of this invention are especially useful.

Let "deferred review" and "deferred editing" and "deferred correction" be understood to mean review, editing, correction done withOUT interruption of the Speech.

Documentation which guides a User to efficiently use ASR

One embodiment is an on-line error message which describe the correct versus incorrect use of ASR. Another is an on-line tutorial screen, or a help screen, which explicitly describes the use of ASR. Another embodiment is off-line documentation which explicitly describes the use of ASR. Off-line documentation may include instruction booklets, package notes, or advertising which describe the use of ASR.

Distinctness

Each of these User Interface features and Automatic Interface features is quite useful for very perceptive ASR. However in the absence of very perceptive ASR, these features are unnecessary, irrelevant or meaningless. Thus the presence of one or more of these features indicates a unit designed for very perceptive ASR. For example, these features help to distinguish a Client which embodies this invention (including both ASR and VC) versus a telephone which uses only VC independently of this invention.

Client & Server with Storage on Server

Alternatively, the stored Feature Vector: 930 may be stored at the Server side of the channel. In such embodiment, a real-time Channel is used. Thus, while speaking occurs, there is a Channel 940 connected between Client and Server. This allows very perceptive ASR with almost real-time response, from Client to Server and back to Client.

Preferably, the Client functions are implemented by an enhanced cellular wireless telephone, or an enhanced telephone for wire-line communication. A Server can use the telephone network to enable wide-spread accessibility.

Because of the low data rate of the Feature Vector, this invention enables compatibility between high perceptive ASR and representative Channels for telephony. For example, the Feature Vector uses average data rate of about 3.25 kbits/sec. By comparison, the data rate benchmark for wireline telephony is 64 kbits/sec. The benchmark data rate is 9 kbits/sec for the data sub-channel (sub-channel B) associated with the GSM European Standard for RadioTelephony. Under adverse conditions, the effective data rate may degrade to about 7 kbits/sec. Thus Sg. Feature Vector fits inside wireline and wireless telephony. Thus speech may be communicated as Feature Vectors across GSM sub-channel B, which was nominally intended for data communication. By contrast, GSM nominally defines a very different algorithm for VC of speech, and provides a different sub-channel to communicate that compressed speech. However that VC algorithm is NOT favorable for very perceptive ASR.

An enhanced cellphone may have a very limited keyboard. Therefore on-board weak ASR may be the preferred input mode for mode text corrections. For display of the Recognized Text, even a modest visual display may be useful.

Even in an embodiment wherein a Client has a small memory, such as an enhanced Cellphone, it is useful for notes, for Deferred ASR, and for Feedback. In addition, there is a Server with much more Storage for Remote ASR.

Server & Plural Clients

Figure 14:
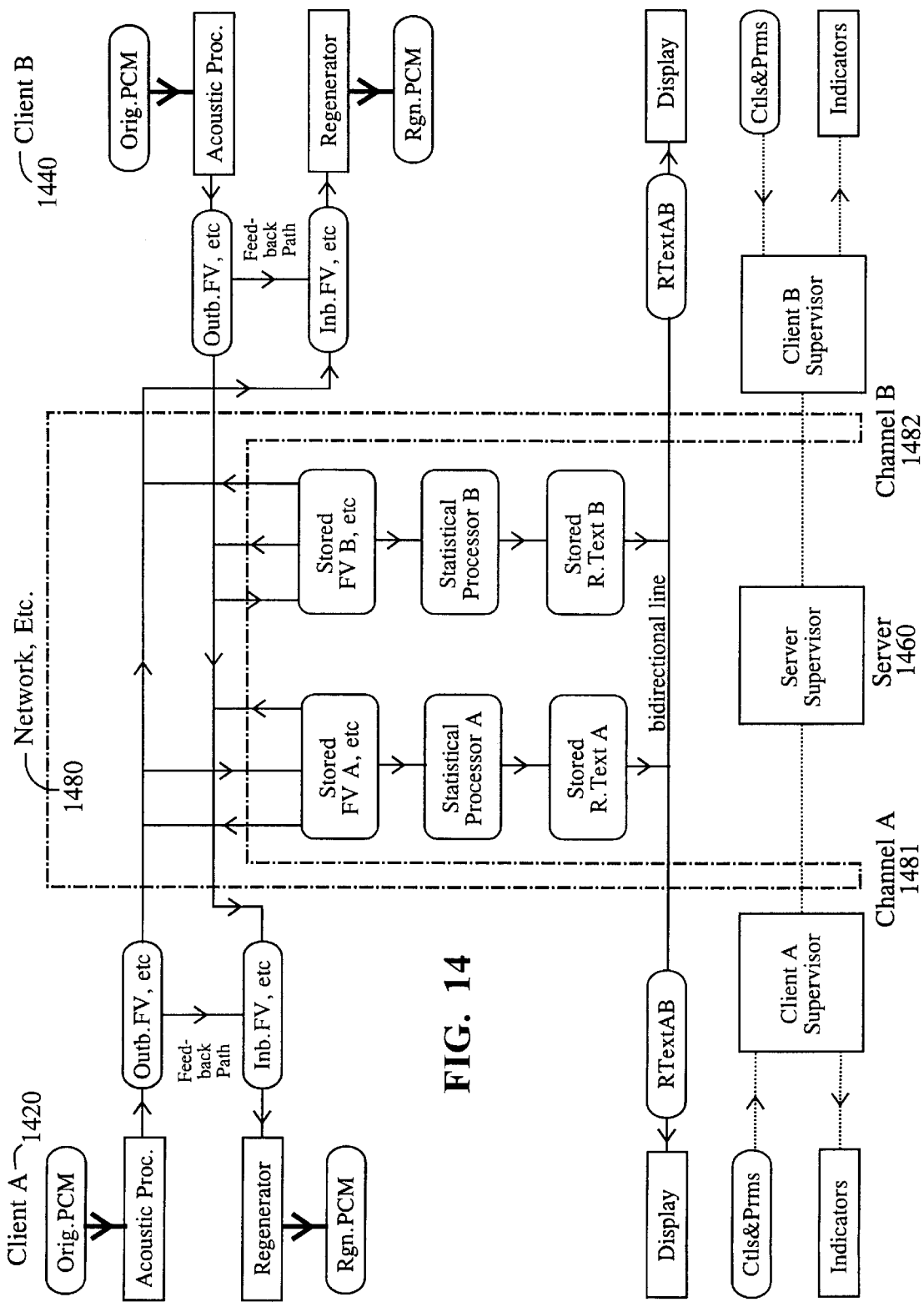
FIG. 14 shows a server/plural clients system according to an embodiment of the present invention.

This invention may be embodied by a system with Plural Clients and one (or more) Servers. FIG. 14 shows a Embodiment with Client A 1420, Client B 1440, a Server 1460, and a Network 1480 including Channels 1481, 1482 connecting these Clients and Server. The components of each Client, Server, and Channel are similar to components already described in FIG. 9. In such embodiment, the Server includes a logically independent set of memory storage and statistical processor for each Client. Each memory stores feature vector and recognized text corresponding to the respective client.

The Statistical Processors are logically-distinct. Nevertheless, they may be embodied by plural uncoupled processes, or by one multiplexed process. The Recognized Text from each client is communicated back to all clients.

In addition, there is communication between plural Clients. Client A produces and emits a Sg. Outbound Feature Vector which is communicated via one or more Channel to Client B. This signal feeds the Regenerator at Client B which produces a Sg. Regenerated PCM 1016B. Likewise, there is communication from Client B to Client A. In one Embodiment, one or more Channels are part of an overall Network, such as a telephone network, possibly including radio-telephone links, and including wire-line links. Thus each Client and each Server is a service node on this Network.

This embodiment enables plural Users to have a dialogue or teleconference, and simultaneously for the Server to prepare a transcript, which includes the Recognized Text from the plural Users. This embodiment would be especially useful for a dialogue or teleconference to negotiate a joint agreement.

Another embodiment is a system with plural Clients, with storage of all Feature Vectors on at least one Client. Also, this can be generalized to a system with multiple Servers.

Figure 10:
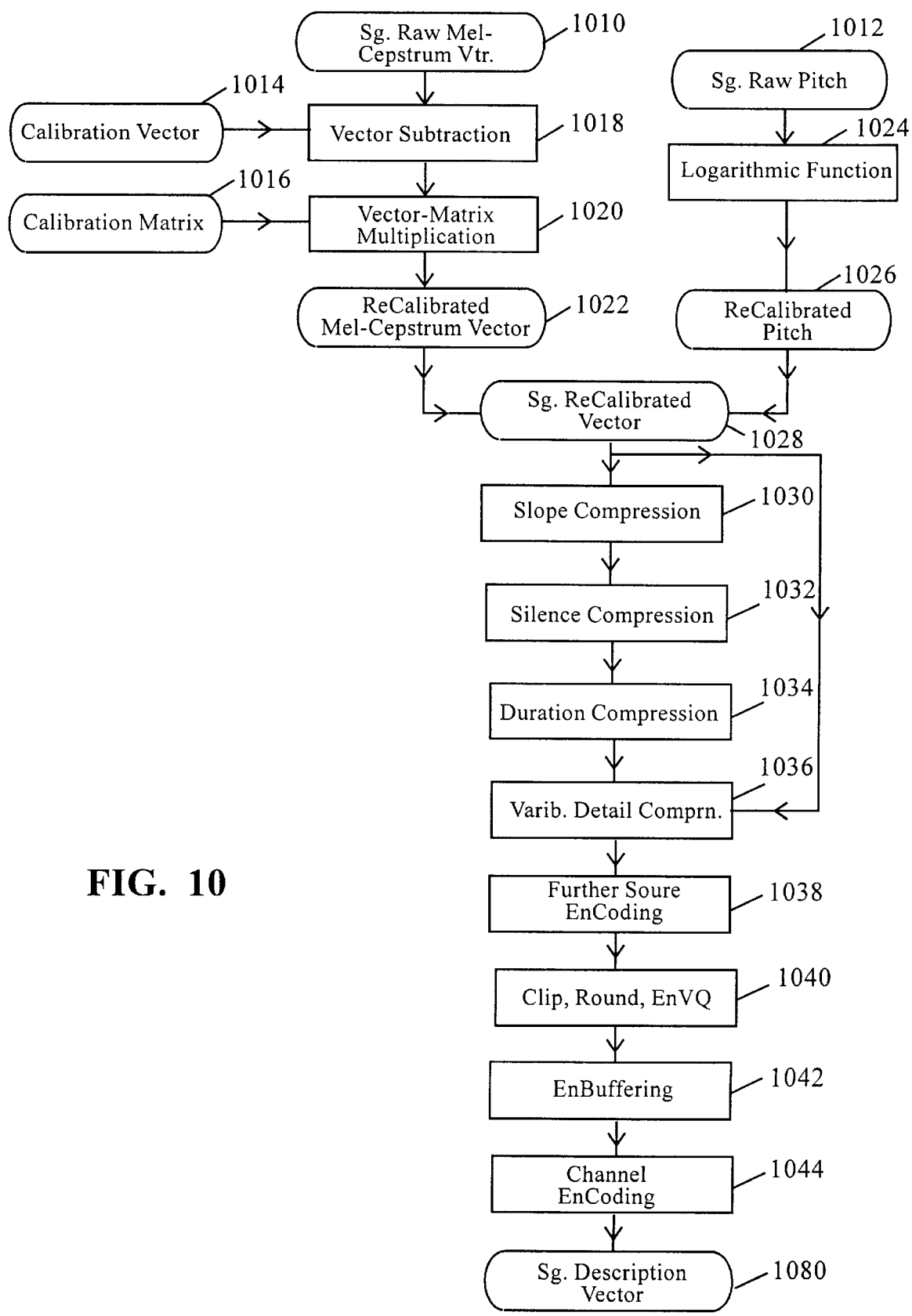
FIG. 10 is a block diagram of an encoder of the present invention.

Details Concerning Embodiment of Encoder and Decoder
Calibration Features in Encoder FIG. 10 shows Details of an Encoder suitable for the present invention. The Encoder starts with two input signals, Sg. Raw Mel-Cepstrum Vector 1010 and Sg. Raw Pitch 1012. The Encoder produces one output signal, Sg. Description Vector 1080. The Encoder holds a Calibration Vector 1014 and a Calibration Matrix 1016.

The Sg. Raw Mel-Cepstrum Vector 1010 is modified by Vector Subtraction 1018 using the Calibration Vector 1014, and modified by Vector-Matrix Multiplication 1020 using the Calibration Matrix 1016. This produces a Sg. ReCalibrated Mel-Cepstrum Vector 1022. The Sg. Raw Pitch 1012 is modified by a Logarithmic Function 1024 to produce a Sg. ReCalibrated Pitch 1026. This is concatenated with the ReCalibrated Mel-Cepstrum Vector 1022 to form a Sg. ReCalibrated Vector 1028.

These Calibration features cancel out constants which otherwise would waste bandwidth. Thus these Calibration features provide considerable compression, as well as achieving compatible calibration.

In FIG. 10, the Encoder includes several auxiliary features to further improve compression. These include: Slope Compression 1030, Silence Compression 1032, Duration Compression 1034, Variable Detail Compression 1036, Further Source Encoding 1038, Clipping, Rounding and Vector Quantization 1040, EnBuffering 1042, and Channel Encoding 1044.

The Duration Compression 1034 and Further Source Encoding 1038 are optional, and diverge from the Primary Criteria described above.

Alternatively, in the Encoder FIG. 10, Clipping, Rounding are included in Clipping, Rounding and Vector Quantization 1040. These calculations may be re-distributed, and applied separately to the ReCalibrated Mel-Cepstrum Vector 1022 and applied separately to the ReCalibrated Pitch 1026 upstream of their unification into the Sg. ReCalibrated Vector 1028.

Slope Compression

Figure 1:
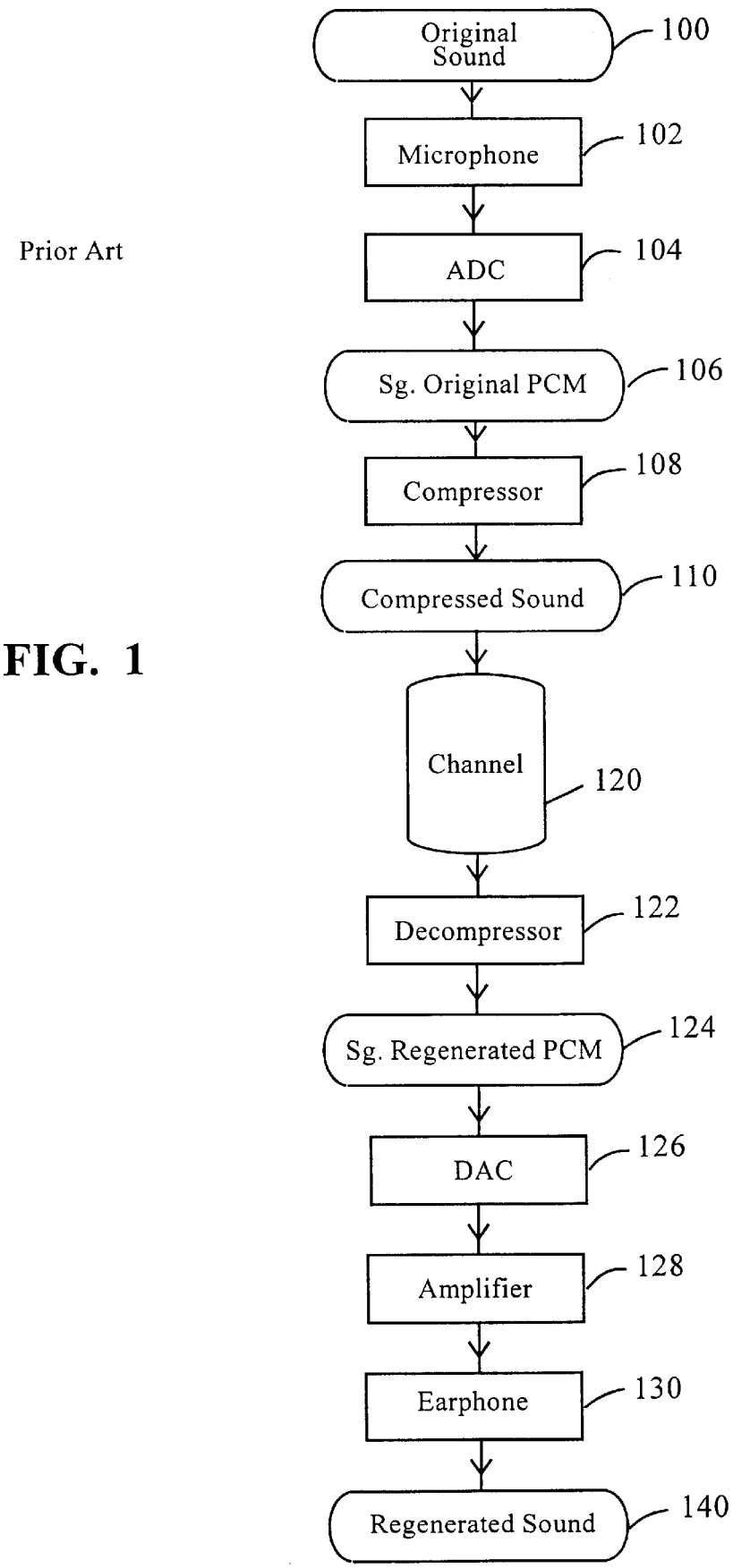
FIG. 1 shows a prior art vocoder.
Figure 2:
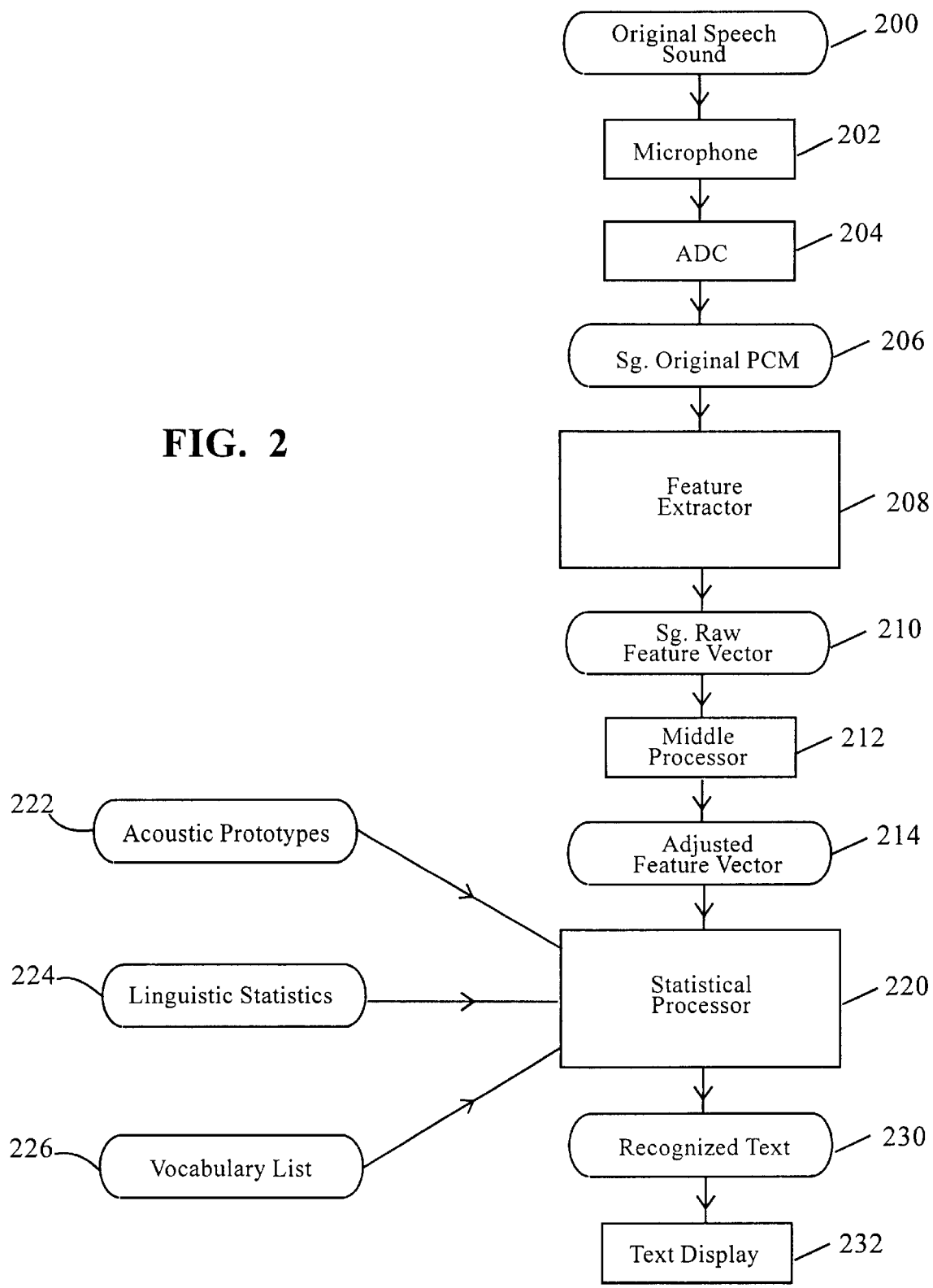
FIG. 2 shows a prior art automatic speech recognition device.
Figure 3:
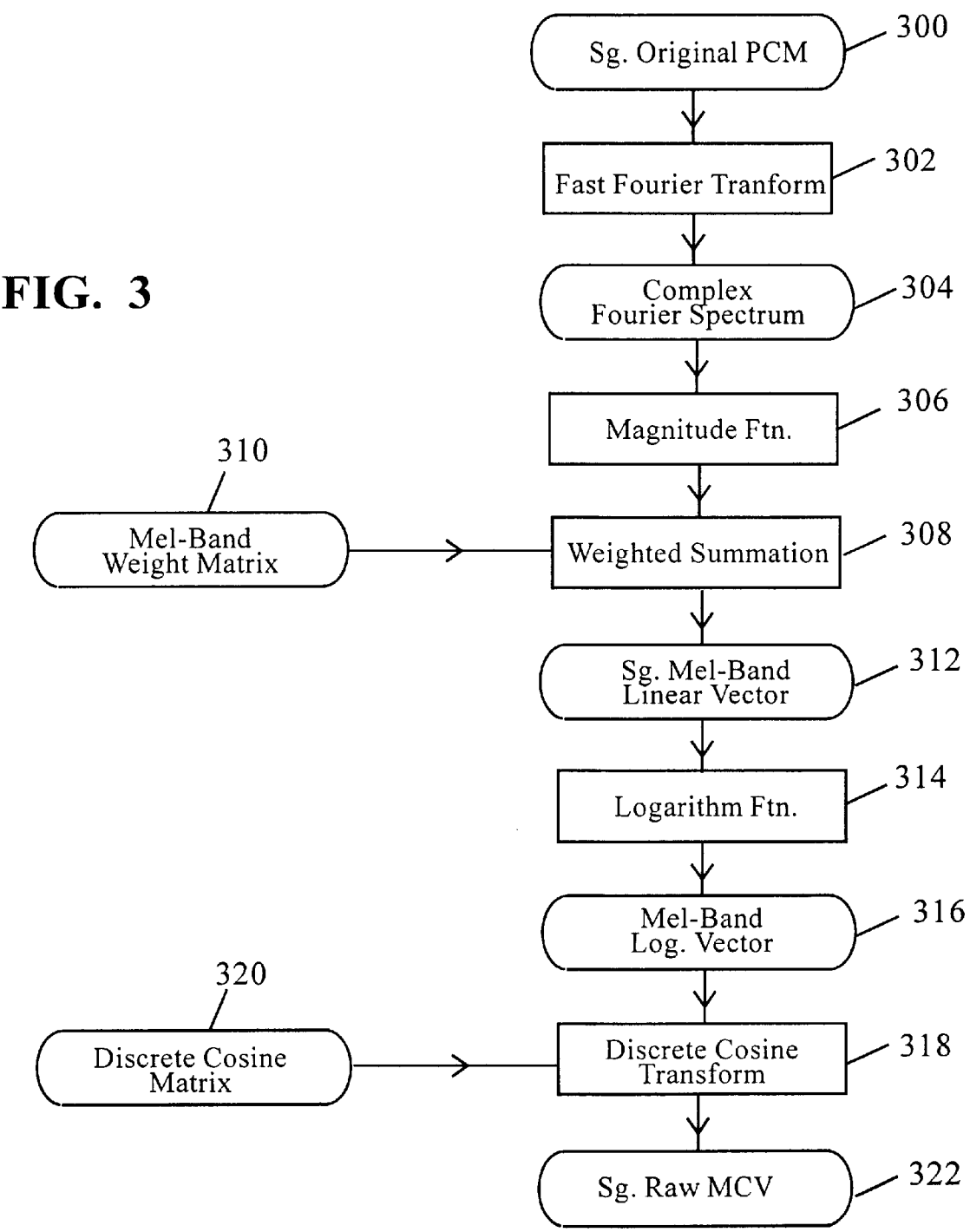
FIG. 3 shows a feature extractor in a prior art ASR system.
Figure 4:
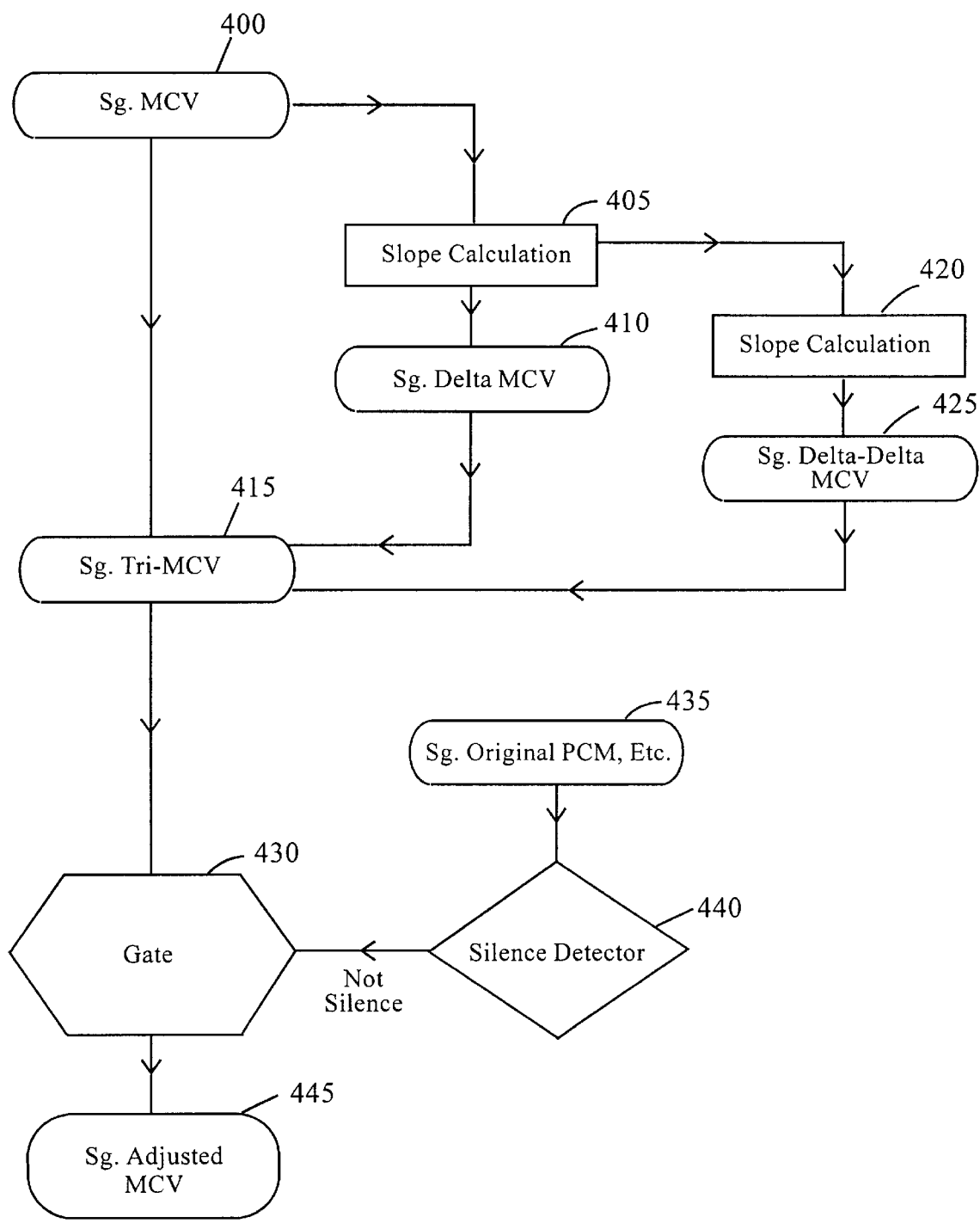
FIG. 4 shows a middle processor of a prior art ASR system.

The Sg.ReCalibrated Vector 1028 feeds the Slope Compressor 1030. This calculates Sg. Mel-Cepstrum Vector. The Slope Compressor preferably is based on the Slope Calculation 405 for Prior Art ASR, as shown in FIG. 4. Thus Slope Compression is designed for synergism and compatibility between ASR and VC, and differs significantly from the "generic" Adaptive coding often used in VC.

Silence Compression

The Silence Compression 1032 includes a Silence Detector and a Gate (Not shown in FIG. 10). In a prefered embodiment, these are similar to the Silence Detector 440 and Gate 430 as described in FIG. 4 concerning the Prior Art ASR. Thus Silence Detection is designed for synergism and compatibility between ASR and VC, and differs significantly from "generic" run-length compression often used in VC.

When there is NOT silence, this Gate copies from its input to its output. When Silence is recognized, this Gate compresses the output. The output includes a representative vector, the duration of this silence, and a marker to indicate this compression.

Duration Compression

The Duration Compression 1034 tests if its input approximates a prolonged smoothly changing signal. Whenever the signal is NOT smoothly changing, then the output from the Duration Compressor is copied from its input. Some examples include consonants, brief vowels, speech with irregular background noise. Other times, the Duration Compression recognizes a smoothly changing signal. Then the Duration Compressor compresses the signal, so the corresponding output includes some representative signal vectors, the time-intervals between them, and a marker to indicate this compression. Examples include certain slow vowels, interword transitions, intentional pauses, when there is NOT strong abrupt background noise.

Variable Detail Compression

The Variable Detail Compression 1034 may have its output copied from its input. Occasionally, its output is copied from the Sg.ReCalibrated Vector 1028, with a marker to indicate non-compression. This occurs on special occasions: at start up; whenever there a is an overload: when a coefficient of the ReCalibrated Mel-Cepstrum Vector exceeds the span; following interruption (eg: silence, overload, channel blockage); or when 99 frames of ReCalibrated Mel-Cepstrum Vector have been transmitted.

Advantageously, the Variable Detail Compressor improves system robustness to cope with occasional strong acoustic or electronic noise; to reduce the effect of an occasional error in the Channel; and to reduce cumulative errors in general.

Clipping, Rounding and Vector Quantization

The illustrative system is designed for a certain range of coefficients. Nevertheless, a coefficient may occasionally exceed this range. The coefficient is clipped to the nearest allowable value. Each coefficient has a finite resolution, which is much coarser than the nominal accuracy of a floating point number. Therefore each coefficient is rounded to a rational fraction whose demoninator matches the resolution. (eg: If the resolution is ¼ dB, then 1.795 dB is rounded to $\frac{7}{4}$ dB). In some cases, it is more efficient to code several coefficients together rather than coding each coefficient separately. For example, suppose variable A has equi-probable values {1, 2, 3, 4, 5} and is coded with 3 bits. Suppose B has equi-probable values {1, 2, 3}, and is coded with 2 bits. Thus (A,B) is coded with 5 bits. By contrast, it is more efficient to code (A,B) using 4 bits with equiprobable values {1, . . . 15}.

The device according to the present invention preferably uses "virtually lossless Vector Quantization" to simultaneously encode several coefficients.

Variable Data Rate and Buffering

The preceding Additional Compression Features produce a signal with variable data rate, which feeds EnBuffering 1042. This smooths the medium-term data-rate maximum value so it approaches the medium-term data-rate average value to match a Channel with fixed bandwidth.

Decoder

Figure 11:
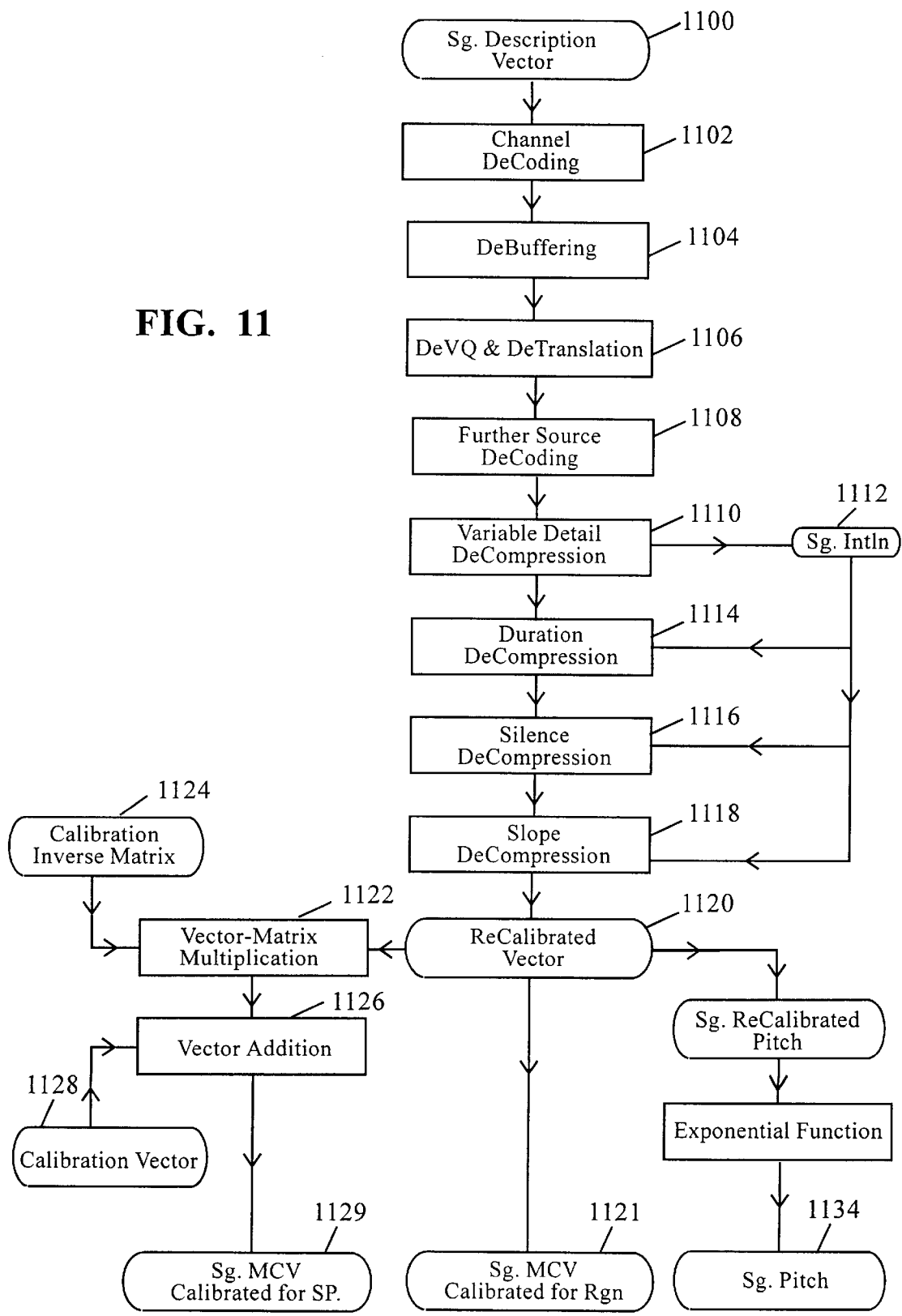
FIG. 11 shows an embodiment of a decoder of the present invention.

FIG. 11 shows a Decoder of an illustrative embodiment according to the present invention. The Decoder input is Sg. Description Vector 1100. The Decoder has three outputs: Sg. Mel-Cepstrum Vector Calibrated for Signal Processor 1129, Sg. Mel-Cepstrum Vector Calibrated for Regeneration 1121, Sg. Pitch 1134. In a Preferred Embodiment, the Sg. Description Vector 1100 feeds Channel DeCoding 1102, which feeds DeBuffering 1104, which feeds Vector DeQuantization and DeTranslation 1106. This feeds Further Source DeCoding 1108, which feeds Variable Detail DeCompression 1110, which tests for the corresponding Marker. When the Marker indicates non-compression, then Variable Detail DeCompression produces Sg. Initialization 1112, which is used to initialize or re-initialize downstream processes. Normally Variable Detail DeCompression copies from its input to its output. This output feeds Duration DeCompression 1114, which feeds Silence DeCompression 1116, which feeds Slope DeCompression 1118, which produces a Sg. ReCalibrated Vector 1120.

In Decoder Detail FIG. 11, inside Slope DeCompression 1118, there are more detailed calculations. These are inverse to calculations inside Slope Compression 1018 in the Encoder Detail FIG. 10. The Slope DeCompression 1118 starts with Sg. Delta Mel-Cepstrum Vector. Via a running summation, it calculates the Sg. Mel-Cepstrum Vector. This running summation is initialized by the Sg. ReCalibrated Vector provided by the Variable Detail DeCompression 1110.

A Middle Processor calculates a Tri-Mel-Cepstrum Vector, which includes the Mel-Cepstrum Vector, Delta Mel-Cepstrum Vector and Delta-Delta Mel-Cepstrum Vector.

Therefore, in FIG. 11, a form of MCV is fed into the Slope DeCompressor 1118. From this input, a running sum is used to calculate the Sg. Delta MCV. Also, from this input, Vector Storage and Vector Subtraction are used to form Sg. Delta-Delta MCV. Thus the Slope DeCompressor 1118 calculates a regenerated tri-vector, analogous to the Sg. Tri-MCV 415 shown in FIG. 4 concerning Prior Art ASR.

This tri-vector is modified by Vector-Matrix Multiplication 1122 using the Calibration Inverse Matrix 1124. This is further modified by Vector Addition 1126 using the Calibration Vector 1128. Thus is produced a Sg. MCV Calibrated for Statistical Processor.

Let "vector linear Means" be understood to include vector addition, vector subtraction, vector scalar multiplication, vector matrix multiplication, or any combination of these. Thus the EnCoder and DeCoder each use a vector linear Means for Calibration.

A sightly different embodiment of the Slope DeCompressor 1118 employs algebraic rearrangement so that the calculation of Delta-Delta MCV which may be moved downstream of the vector-linear calculation for calibration.

The Prior Art of VC includes myriad algorithms. In general, strong bandwidth reduction requires a "lossy" VC which discards information. When the resulting signal is compressed and regenerated, errors and noise are implicitly introduced. When lossy VC is superimposed on ASR, there is a strong possibility to degrade the recognition accuracy.

In the broad Prior Art of VC, one lossy algorithm was "run-length coding". This tested for a run of similar values. If a long run was detected, it was encoded as a rounded representative value and duration. Otherwise, the values were simply rounded by this encoding. Another lossy algorithm was "adaptive-delta coding". This calculated the difference between successive input values, rounded the result, and used it in encoding of the original values. When superimposed on ASR, these lossy algorithms reduce ASR accuracy.

By contrast, the Slope Coding and Silence Coding of a preferred embodiment each follow the description concerning FIG. 4 of the Prior Art ASR. Thus ASR accuracy is maintained, and simultaneously bandwidth is reduced. This maximizes synergism and compatibility between ASR and VC. Please note this synergism and compatibility are largely INDEPENDENT of the style of speech and Acoustic Prototypes.

Slope Coding and Silence Coding introduce various errors and recognition inaccuracy into ASR. However, these processes are specialized, so that their errors are parallel to errors ALREADY included via the Middle Processor of ASR. Thus using these special VC processes do NOT cause EXTRA loss of accuracy for ASR.

Source Coding and Channel Coding

Classical Information Theory decomposes coding into "source coding" and "channel coding".

"Source coding" attempts to recognize and to compress redundancy in the signals entering an Encoder. Most Encoder processes described above are largely source coding. These partly achieve the classical ideal of an output signal with zero correlations between bits, and with equal statistical significance for all bits. An Embodiment may include Further Source Encoding 1038 and Further Source DeCoding 1081 to come closer to the classical ideal. Depending on the style of speech and Acoustic Prototypes, then Further Coding might degrade accuracy for ASR.

"Channel coding" attempts to optimize robustness against Channels errors. Typically this spreads out information, adds redundancy, and increases bandwidth. The illustrative Embodiment of the invention includes Channel Encoding and Channel DeCoding. Often Channel coding is closely coupled to properties of the Channel, and less coupled to ASR and VC.

Additional Compression

Various applications may favor various criteria, such as tighter or looser compression, more or less robustness, higher or lower quality regeneration. These lead to various Embodiments of this invention, particularly various Embodiments of Additional Compression.

The Prior Art of Statistical Processors for ASR included features to recognize sounds with variable duration. One embodiment was the "Hidden Markov Model" or "HMM". An earlier embodiment was "Dynamic Time Warping" or "DTW". Also the Linguistic Statistics effectively included data on sound duration. These resources may be adapted and simplified for the Duration Compression to test for "a prolonged smoothly changing signal with little or no background noise".

Conjugationally Equivalent Embodiments

Starting with one Embodiment of this invention, one can readily design other Embodiments. Consider a pair of transformations (F, G) such that F maps each Feature Vector to an intermediate vector, and G maps this intermediate vector back to approximately the original Feature Vector. Thus (F, G) applied successively leave the Feature Vector approximately unchanged. Such transformations are described as inverse, reciprocal or mutually canceling.

For example, in FIGS. 5 through 8, introduce transformation F upstream of the Channel 515, 616, 720, 816, and introduce transformation G downstream of the Channel. Transformation F effects data which ultimately feeds the Signal Processor and ultimately feeds the Regenerator. Likewise, Transformation G ought to effect both the processes. Nevertheless, these transformations will mutually cancel, and overall system functions of ASR and VC will be unchanged.

These transformations may be explicit and distinct in the system. These transformations may be unified, implicit, or covertly hidden inside other system elements. These transformations may be localized within the system, or may be spread among several system elements. In FIGS. 5 through 8, transformation G may be applied once at Node 516, 618, 722, 817. Equivalently, transformation G may be "distributed", and applied separately to the input of the Statistical Processor and applied separately to the input of the Regenerator.

Another illustration is to add a fixed vector in the Encoder, and to subtract the same fixed vector in the Decoder. Another technique is to multiply by a fixed non-singular matrix in the Encoder, and to multiply by the corresponding fixed inverse matrix in the Decoder. Some aspects of these extra transformations may be unified with Calibration Constants and Calibration Processes described above. Another example is a non-linear transform in the Encoder, and a corresponding inverse non-linear transformation in the Decoder.

The Prior Art of Cryptography includes many pairs of mutually canceling transformations. Each pair leads to another embodiment of this invention.

The Prior Art of Coding includes many kinds of "lossless coding", which uses a pair of mutually canceling transformations. Each such pair leads to another embodiment.

In the Prior Art of Advanced Algebra, many algebraic relations are "invariant under conjugation" using two transformation which are mutually canceling. Likewise, two algebraic systems are often described as "equivalent under conjugation".

Likewise, two systems for ASR and VC shall be described as "Conjugationally equivalent" if they are related by some pair of mutually canceling transformations. Also likewise, consider two apparatti suitably use in such systems. Two apparatti shall be described as "Conjugationally equivalent" if they are related by some pair of mutually canceling transformations.

One of ordinary skill in the art can use these generalizations to construct numerous embodiments. Nevertheless, the overall system functions of VC and ASR will be substantially unchanged.

Nominal Bandwidth

Narrow bandwidth is an important aspect of this invention. This Section estimates the nominal bandwidth of various signals in the illustrative embodiment.

Let "a float" mean "a floating point number expressed as 32 bits". Also, following a number, the suffix "k" indicates "thousand". Thus "176k" means "176,000". Also let Lg(X) indicate the logarithm of X to the base 2.

Let "ReCalibrated Mel-Cepstrum Vector" be abbreviated "ReMCV". This includes 13 coefficients, which are identified by an "index" from 0 through 12. Thus the ReMCV coefficients are indicated ReMCV[0] through ReMCV[12].

As described in the Section on Calibration, these coefficients have a well-defined calibration, and are measured in dB (decibels). Likewise, let the "DeltaMCV" indicate the coefficients of the vector difference between successive values of ReMCV.

Let "[+32 to −32) dB" indicate the interval of values which are equal or less than +32 dB, but greater than −32 dB. Likewise "[+4 to −4) dB" indicates values between +4 dB and −4 dB. A vector is "tapered" if its coefficients vary monotonically with the index. Likewise, "tapered" can apply to parameters related to a vector.

Consider a Signal conveyed via an Encoder/Channel/Decoder. Let the "Signal range" be the interval from the minimum to maximum values of the Signal entering the Channel etc. Let the "Channel span" be the interval from minimum to maximum values which the Channel etc. can convey. "Signal range" and "Channel span" are logically distinct. For accurate transmission, the Channel span ought to equal or exceed the Signal range. For efficient transmission, the Channel span is equal to the Signal range.

Original PCM

The Sg. Original PCM has a nominal bandwidth:

(176k bits/sec)=(11k samples/sec) * (16 bits/sample)

This greatly exceeds 64k bits/sec, the benchmark data rate for telephony.

Raw Mel-Cepstrum Vector and Raw Pitch

As previously noted, the coefficients of the Sg. Raw Mel-Cepstrum have a wide range. Therefore each coefficient is expressed as a float with 32 bits. There are 13 of these coefficients. In addition, each value of Sg. Raw Pitch is a float of 32 bits. There are 100 frames/sec, and each frame includes a Raw Mel-Cepstrum Vector and a Raw Pitch value. Therefore the nominal bandwidth or data rate is:

(44.8k bits/sec)=14 floats/frame * 32 bits/float * 100 frames/sec

ReCalibrated Mel-Cepstrum Vector

The Calibration Vector and Calibration Matrix were measured as described in the Section on Calibration. Then, using these Calibration Constants, a few Speech Samples were processed, and the ReCalibrated Mel-Cepstrum Vectors were examined. These samples used a good lip microphone, and were free of loud background noises.

The ReCalibrated Mel-Cepstrum Vector coefficients were quite well-behaved. Their dynamic range was tapered, from about [−12.0, +12.0) for ReMCV[0], to about [−3.0, +3.0) dB for ReMCV[12].

To extrapolate from this small sample, additional range is necessary to handle variations in overall volume, in microphone sensitivity, in room acoustics. It may be very generous to provide a Channel with a tapered span, from [−32 to +32) dB for ReMCV[0] to [−8 to +8) dB for ReMCV[12]. However the bandwidth increases slowly (logarithmically) with the span.

Rounding and Resolution

In human perception, 1 dB is typically the smallest perceptible increment. This sets the scale for the resolution needed for ASR and VC functions. In addition, some guard bits are useful to minimize round-off effects. Therefore, the preferred embodiment has tapered resolution, from ¼ dB for ReMCV[0] through one half dB for ReMCV[12]. The Encoder uses this tapered resolution to roundoff coefficient values.

Temporarily consider an embodiment which does NOT use Delta Compression, Silence Compression, Duration Compression, or Variable Detail Compression. Their effects will be considered later. For each coefficient of ReMCV, based on its Channel span and Resolution, one can calculate the nominal number of distinct values, and-hence calculate its nominal data content. For ReMC[0], there are 256=2 * 32 * 4 distinct values. The nominal data content presumes these values were equally probable. Therefore the data content is:

8 bits=Lg(2 * 32 * 4) For ReMC[12], there are 64=2 * 4 * 2 distinct values. Therefore the nominal data content is:

5 bits=Lg(2 * 8 * 2) Intermediate coefficients have intermediate data content. For ReMC[0] through ReMC[12], the average data content is approximately:

6.5 bits/coefficent=(8+5)/2 Also the Pitch has data content. Since human hearing is logarithmically sensitive to frequency, therefore Pitch is encoded via a Logarithmic Function. The result can be adequately encoded by 8 bits or less.

Vector Quantization

If each coefficient were encoded separately, its data content must be rounded up to an integer number of bits. This penalty can be reduced by encoding several coefficients together. This process is sometimes called Vector Quantization. In the illustrative Embodiment, Lossless Vector Quantization is used to avoid possibly degraded ASR. Another embodiment is Lossy Vector Quantization. This offers narrower bandwidth or low data rate, with possible degradation of ASR.

Consider the Description Vector, which includes ReMCV and RePitch, for an embodiment Delta Compression or Silence Compression. The nominal data rate is approximately:

9.25 k bits/sec=(13 coeff/frame * 6.5 bits/coeff +8 bits/frame) * 100 frame/sec

Delta Compression

In Section on Calibration describes the dynamic range of ReMCV and DeltaMCV. Delta ReMC has a smaller dynamic range than ReMC, both because of serial correlation in human speech, and because many environmental variations cancel out. Also Delta Log Pitch has a smaller dynamic range than Log Pitch.

A reasonable simplification is that each Delta coefficent has a dynamic range 2 bits smaller the corresponding un-subtracted coefficient. Thus the nominal data rate is approximately:

6.45 k bits/sec=(13 coeff/frame * 4.5 bits/coeff +6 bits/frame) * 100 frame/sec

Variable Detail Coding

A complete calculation would require too much detail. A simplified approximation to the average nominal data rate is:

6.48 k bits/sec=(6.45 * 0.99 +9.25 * 0.01)=(6.45 +0.01 * (9.25–6.45)) kbits/sec

Another embodiment is to narrow the Channel spans for the DeltaMCV, and to use Variable Detail to cope with values of occasional overload, which exceeds the channel span. Thus the required data rate may be reduced.

Silence Compression

The effect of Silence Compression depends on the style of speech, and on the background noise. Suppose there is 50% silence. Thus the nominal average data rate is approximately:

3.25 k bits/sec=(6.45 * 0.99 * 0.50+9.25 * 0.01)=(3.225+ 2.8 * 0.01) kbits/sec

Buffering will partly reduce some variations. Thus medium term peak bandwidth will approach the medium term average bandwidth.

Buffering and Overload

Silence Compression will cause variable data rate. Also Variable Detail coding will cause a variable data rate. In many cases, this variation can be smoothed by buffering, so the medium term maximum data rate approaches the medium term average data rate. This help s match a Channel which has constant capacity (maximum bandwidth).

In extreme cases this could be inadequate. Sustained strong noise could cause sustained overloading of Delta MCV coefficients, and overload the buffering, and overwhelm the sustained bandwidth of the Channel. Also, sustained strong noise could overwhelm any speech. Thus communication becomes inadequate, and ASR and VC become pointless. The system designer ought to provide a policy for this sustained overload. One option is to send a coded message which indicates overload, and to fall back to a lower rate (ie: to send ReMCV at 50 frames/sec.) until the overload ceases.

Embodiments of Rapidly Adjustable Filter

Filtering by Time-Domain Convolution

One embodiment of the Rapidly Adjustable Filter is a time-domain convolution filter. This uses forward and recursive (FIR and IIR) difference equations in a Filter which matches arbitrary given Mel-Cepstrum values. One embodiment uses the prior art Filter described by S.Imai in ICASSP'87, as discussed above.

This time-domain Filter embodiment uses many difference equations with many terms. This is especially true for high-order Mel-Cepstrum coefficients, such as MCV[9] through MCV[12]. This incurs a burden of program complexity and computing load. An alternative embodiment trades these burdens for the burden of an inverse-FFT calculation.

Filtering by Frequency-Domain Multiplication and Inverse FFT

In the Prior Art of Linear Filter Theory, an important theorem connects each time-domain convolution filter with a corresponding frequency-domain multiplication filter. Therefore, another embodiment of the Rapidly Adjustable Filter uses frequency-domain multiplication, followed by the inverse FFT.

For this embodiment, the Excitation Generator directly produces the Fourier Spectrum of Excitation Signal. The Mel-Cepstrum Vector calculates the Fourier Spectrum of the filter kernel. Corresponding coefficients of these two Spectra are multiplied to produce the Fourier Spectrum of the Regenerated PCM. Finally, the inverse FFT tranforms the latter to the time-domain Regenerated PCM.

Comparison

Compared to a time-domain Filter, the frequency-domain Filter offers more regular filter algebra, and may enable more regular programming. However the frequency-domain Filter requires calculating the inverse FFT. A frequency-domain Excitation Generator may be almost as fast and simple as a time-domain Excitation Generator. Thus the speed advantage and Preferred Embodiment of the Rapidly Adjustable Filter may depend on specifics, such as the presence or absence of a built-in FFT.

Parameter Transitions in Time-Domain Rapidly Adjustable Filter

The Regenerated PCM is calculated about 11 k times/sec. By contrast, about 100 times/sec, there is a new frame, a new Description Vector, and new Mel-Cepstrum coefficient values, which are used to update the Rapidly Adjustable Filter. Sometimes, the Mel-Cepstrum values changes strongly from frame to frame. In an unsatisfactory implementation, this causes an abrupt, large change in the Regenerated PCM. A User-Listener perceives this sharp change as disagreeable noise which obscures the Regenerated Speech.

This discontinuity and noise can be greatly reduced by interpolation of the Mel-Cepstrum Vector. For each new value of Regenerated PCM, interpolate between frames of the MCV, and update the Rapidly Adjustable Filter. Thus there are many tiny changes, instead of the above problem. Considering Nyquist's Theorem and band-limited signals, it is preferable to use an interpolation kernel based on sinc (X)=sin(X)/X. See, "The Sampling Theorem", on pg. 29—33 of "Digital Signal Processing Principles, Algorithms, and Applications, 3rd Edition", by J.Proakis and D.Manolakis, published in 1996 by Prentice-Hall. This interpolation is well-suited for implementation on a DSP Digital Signal Processor.

Calibration Measurement

An important teaching of this invention is to perceive that various "Mel-Cepstrum Vectors" are NOT directly compatible, and to teach structures and methods to overcome this incompatibility. In particular, to achieve compatibility, between the Feature Extractor embodiment of IBM Voice Type 3, and the Rapidly Adjustable Filter embodiment of S.Imai, it is important to measure and use Calibration Constants which compensate for their differences.

Calibration System

Figure 12:
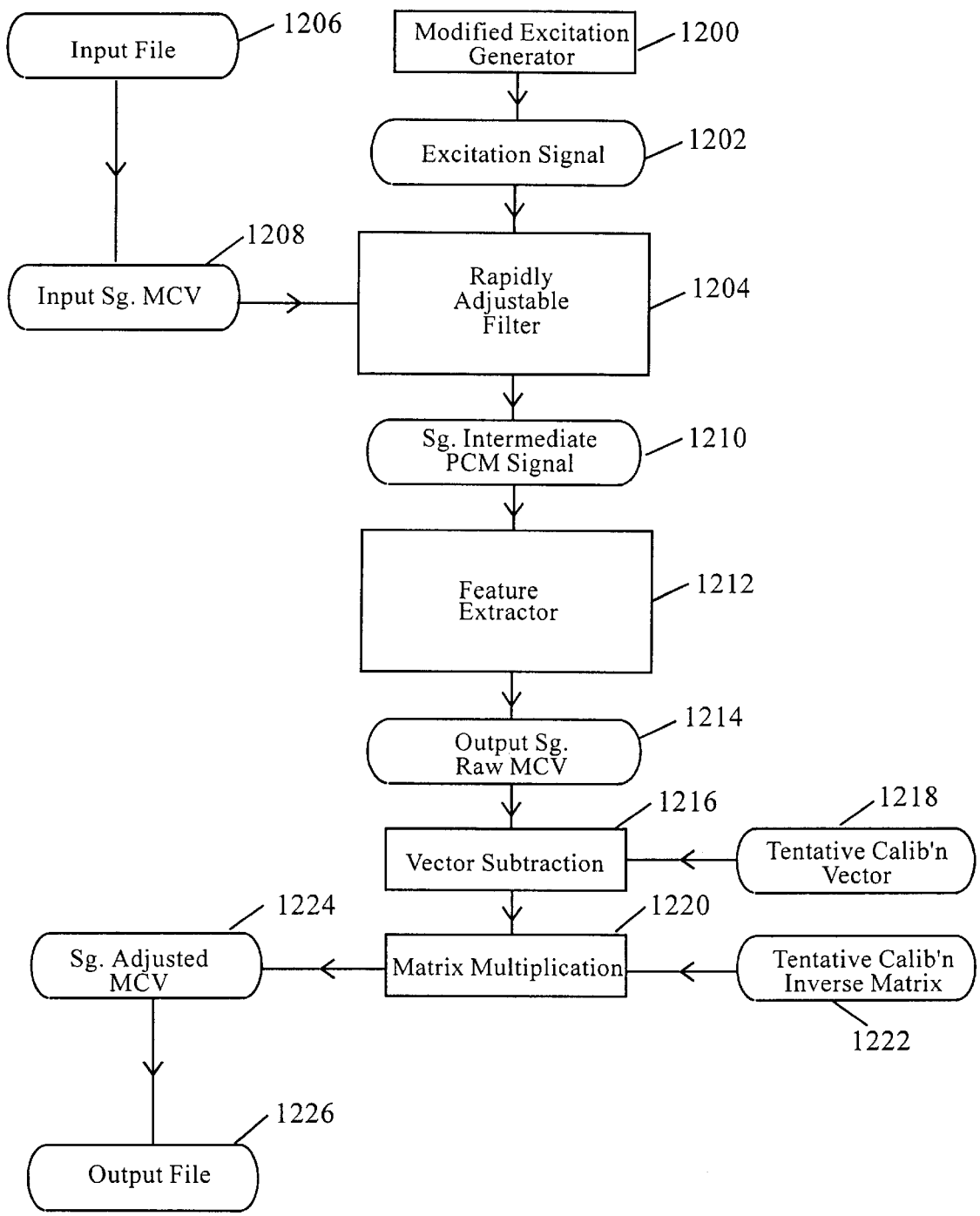
FIG. 12 illustrates a block diagram of a calibration system of the present invention.

FIG. 12 shows an off-line system to measure Calibration Constants

A modified Excitation Generator 1200 produces an Excitation Signal 1202, which feeds a Rapidly Adjustable Filter 1204. An Input File 1206 emits a Sg. Mel-Cepstrum Vectors 1208, which modulates the Rapidly Adjustable Filter 1204. This Filter produces a Sg. Intermediate PCM 1210 which feeds a Feature Extractor 1212, which produces a Sg. Raw Mel-Cepstrum Vector 1214. This is modified by Vector Subtraction 1216, using a Tentative Calibration Vector 1218. The resulting vector is modified by Vector-Matrix Multiplication 1220, using a Tentative Calibration Matrix 1222. This produces a Sg. Adjusted Mel-Cepstrum Vector 1224, which is stored in an Output File 1226.

This Calibration System provides a direct measurement and comparison of the input Sg. Mel-Cepstrum Vector 1208 versus the corresponding outputs, Sg. Raw Mel-Cepstrum Vector 1214 and Sg. Adjusted Mel-Cepstrum Vector 1224. The following timing is relevant to this calibration measurement. Wide bandwidth signals and processes occur at around 11k samples/sec. Narrow bandwidth signals and processes occur once per "frame" of around 10 milliseconds. Each frame, the Rapidly Adjustable Filter 1204 is updated based on the input Sg. Mel-Cepstrum Vector 1208. Every frame, the Feature Extractor 1212 analyzes 256 successive values of the Sg. Intermediate PCM 1210, and produces one Sg. Mel-Cepstrum Vector 1214. Thus there is overlap between the input values for successive frames.

The Excitation Generator 1200 produces one narrow pulse at a specified "phase" (relative time within each frame). The pulse duration is 1 sample. The pulse height is 4,000 counts, as measured on a 16-bit linear PCM scale, from −32,767 to +32,768 counts. These parameters are chosen to produce a very-consistent Sg. Excitation Signal 1202 which has a flat Fourier Spectrum. The output Sg. Raw Mel Cepstrum Vector 1214 is moderately sensitive to the phase of the pulse within each frame of the Sg. Excitation 1202. These measurements were repeated with various excitation phases, and the outputs were averaged together. This average was used in the following calibration steps. Thus the calibration is NOT degraded by this phase sensistivity.

Initially, the Tentative Calibration Vector 1218 was assigned the zero-vector, and the Tentative Calibration Inverse Matrix was assigned the Identity Matrix.

Let the coefficients of the input Sg.Mel-Cepstrum Vector 1208 be indicated by MCVin[0] through MCVin[12]. Also, these coefficients are referred to as "input subchannels".

Let the coefficients of the output Sg. Mel-Cepstrum Vector 1214 be indicated by MCVout[0] through MCVout [12]. Also, these coefficients are referred to as "output subchannels".

Calibration Measurements

The method measures the output MCVout as a function of the input MCVin.

A first measurement is to verify a smooth relationship between the input MCVin and the output MCVout, as long every component of the input is inside the interval [−24 to +24) dB. However, for values appreciably beyond this range, the Rapidly Adjustable Filter gives irregular values (because of limitations of the Pade' approximation used in this Filter).

The next measurement determines the Calibration Vector. Feed in an input vector MCVin with 0.0 dB in every component. Then measure and record the corresponding output vector MCVout.

Thereafter, use this vector as the Calibration Vector 1014 in the Encoder FIG. 10, and as the Calibration Vector 1128 in the Decoder FIG. 11, and as the Tentative Calibration Vector 1218 in the Calibration System FIG. 12.

Let J be a an integer between 0 and 12. For each value of J, prepare Input Files J, with a sequence of vector values for MCVin. All MCVin coefficients should be assigned 0.0 dB, EXCEPT for MCVin[J], which should be assigned values {−24.0, −21.0, . . . 0.0, +21.0, +24.0} dB. Then feed Input File J into the Calibration System, and generate and record the corresponding Output File J.

Analyze Measurements

For Output File J, each component of the MCVout varies approximately linearly as a function of the input MCVin[J]. In other words, the output vectors are a linear function of the input vectors. This linear relationship depends on the input subchannel and depended on the output subchannel.

For Output File J, the largest output coefficient is MCVout [J], followed by either MCVout[J−1] or MCVout[J+1]. Nevertheless, other coefficients are also non-zero. In other words, there is significant cross-talk between sub-channels, particularly between adjacent channels.

Next, summarize these measurements as Response Matrix with 13 * 13 values:

Response_Matrix[K, J]=delta MC—out[K]/ delta $MC_{13}$ in[J]

Use this Response Matrix as the Calibration Inverse Matrix 1124 in the Decoder FIG. 11. Furthermore, feed this Response_Matrix into a standard software program for numerical matrix algebra, and calculate the corresponding inverse matrix. Use this inverse matrix as the Calibration Matrix 1016 in the Encoder FIG. 10, and as the Tentative Calibration Inverse Matrix 1222 in the Calibration System FIG. 12.

Verification

Use these measured Calibration Constants values as the Tentative Calibration Vector 1218 and Tentative Calibration Inverse Matrix 1222. Feed in a wide range of inputs MCVin, and measure the corresponding outputs MCVout. If everything is perfect, then corresponding input and output values will be virtually equal throughout the relevant range.

Calibration and Alternatives Embodiments

The values of the Calibration Constants depend on "arbitrary choices" in the embodiments of the Feature Extractor and the Rapidly Adjustable Filter. Therefore different embodiments may lead to different values.

Embodiments of this invention can work correctly with a variety Acoustic Processors, Regenerators, and Statistical Processors. Furthermore, components which are incompatible can nevertheless be successfully used together because of the Calibration Measurements, Calibration Constants and Calibration Processes as taught by this invention.

In the illustrative Embodiment, the Feature Extractor is based on algebra which uses a discrete Mel-Band calculation, uses implicit "arbitrary weights" which implicitly effect the Discrete Cosine Transform, and uses further implicit "arbitrary choices". By contrast, the Filter is based on algebra which uses continuous Mel-warping, and does NOT use corresponding weights or choices. These differences strongly suggest incompatibility. Nevertheless, there is compatibility because of the Calibration taught by this invention.

In the Prior Art of ASR, there was already compatibility between the Acoustic Processor and the Statistical Processor. These are used in the illustrative Embodiment. A different embodiment can use otherwise incompatible Acoustic Processor and Statistical Processor by introducing corresponding Calibration features.

Embodiment for Voice Activated Dialing (VAD)
Prior Art of VAD

The following is representative of the Prior Art of Voice Activated Dialing (VAD). VAD includes at least one Voice-Training Session, and many Voice-Dialing Sessions.

To start a Voice-Training Session, the User typically dials to the Server, and enters the User Identification (UID). (In some cases, the UID is identical to the User's Telephone Number, so Caller ID implicitly provides UID.) Then the User dials a Destination (telephone number), and pronounces several samples of the corresponding Name. The Server stores the Destination. From the name samples, the Server constructs a corresponding Acoustic Prototype. Also, the Server selects a representative name sample, and stores its Original PCM as the Confirmation. Then the user repeats this procedure, for another Name, Destination, Confirmation.

To start a Voice-Dialing Session, the User picks up the telephone. Explicitly or implicitly, this dials the Server, then sends the UID. The Server uses the UID to verify eligibility, and to recall relevant stored data. Then the Server sends an audio welcome back to the User. The User pronounces a Name. The Server uses ASR to recognize the Name, and hence to determine the most probable Destination. The Server recalls the corresponding Confirmation, and sends it back to the User. If the User does NOT dissent, then the Server connects the User to the Destination. Alternatively, the User may dissent by pronouncing a Name. This restarts the Voice-Dialing Session.

For each Destination of each User, the Server must store the Destination and Confirmation. During each Voice-Dialing Session, the Acknowledgement data must be moved. In a large system which serves many Users, the total storage and total bandwidth are a serious and costly burden.

Invention Embodiment for VAD.

Figure 13:
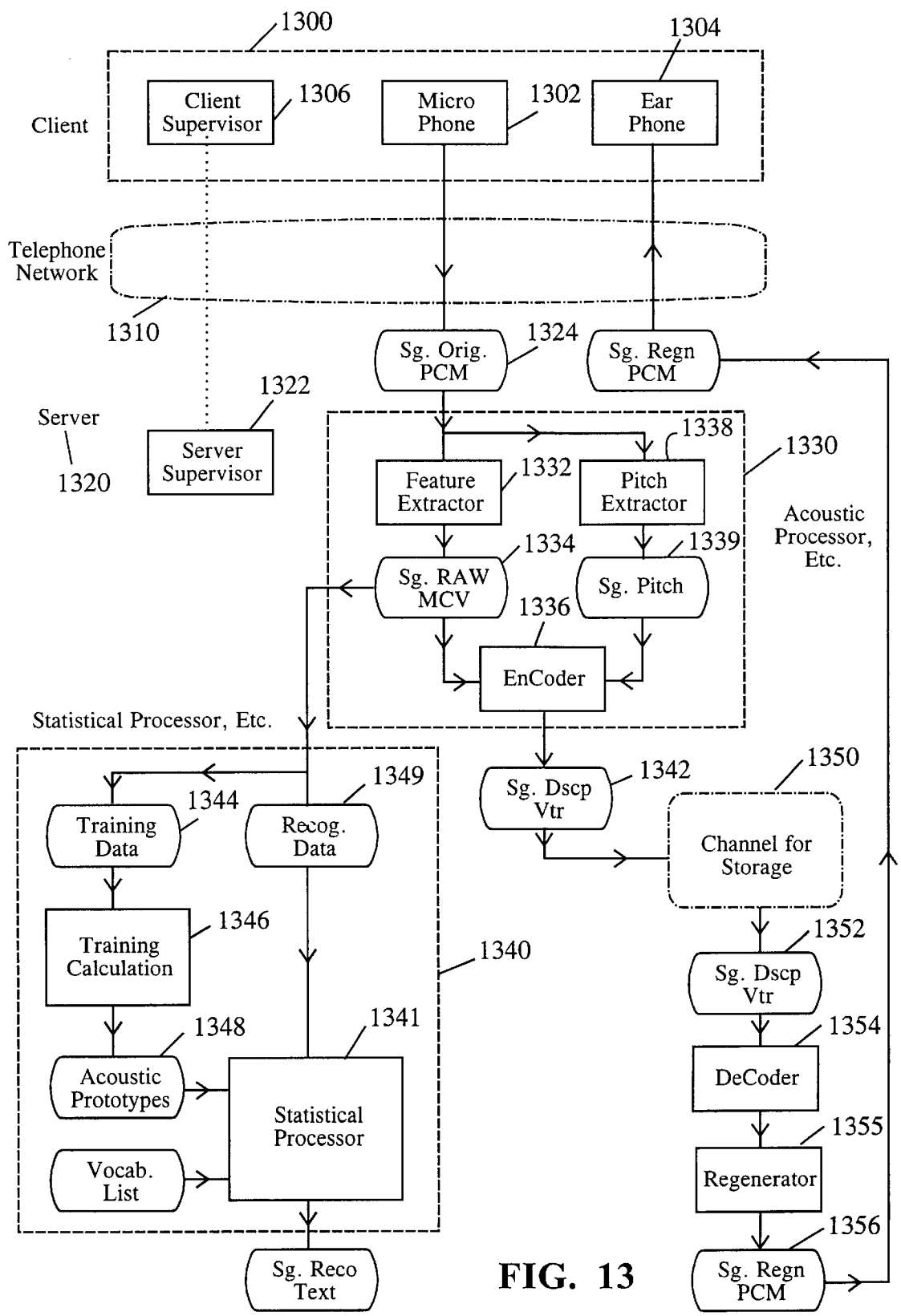
FIG. 13 is a system block diagram of a voice activated dialing system according to the present invention.

These burdens can be considerably reduced by an illustrative Embodiment of the present invention, as shown in FIG. 13.

FIG. 13 includes a Client 1300, a Telephone Network 1310, and a Server 1320.

The Server includes an Acoustic Processor 1330, a Statistical Processor 1340, a Channel for Storage 1350, a Regenerator 1355, and a Server Supervisor 1322. Except as noted here, these items and their components follow the descriptions taught in other Sections of this invention.

The Client 1300 is a telephone set, including a Microphone 1302 and Earphone 1304, and Client Supervisor 1306. The Client has bidirectional communication through the Telephone Network 1310 to the Server 1320.

The Server 1320 uses the UID to identify the relevant Acoustic Prototype List 1348, Vocabulary List 1348a, Confirmation List (which is inside the Channel for Storage 1350). At the start of each Session, the Server uses the UID to locate the relevant lists.

During a Voice-Training Session, the User pronounces a Name, which produces Sg. Original PCM 1324, which feeds the Acoustic Processor 1330. Inside this, the Feature Extractor 1332 calculates a Sg. Raw MCV 1334, which feeds an EnCoder 1336. The Sg. Original PCM also feeds a Pitch Extractor 1338, which produces a Sg. Pitch 1339, which feeds the EnCoder 1336. Thus the EnCoder produces a Sg. Description Vector 1342, which includes the compressed Confirmation. This is stored in the Channel for Storage 1350.

During a Voice-Training Session, the Sg. Raw MCV 1334 is used as Training Input Data 1344 within the Statistical Processor 1340. This feeds a Training Calculation 1346, which adds to the Acoustic Prototype List 1348. This List is stored for later use.

At the start of a Voice-Dialing Session, the Server Supervisor 1322 uses UID to recall the relevant Acoustic Prototype List 1348, Vocabulary List (e.g., Destination List) 1348a, and Confirmation List. These are attached to the Statistical Processor 1340.

During a Voice-Dialing Session, the Sg. Raw MCV 1334 is used as Recognition Input Data 1349. Thus the Statistical Processor 1341 selects the most probable Recognized Text, Etc. 1360. From the Channel for Storage 1350, the Server Supervisor 1322 selects the corresponding Sg. Description Vectors 1352, which conveys a compressed Confirmation Message. This feeds the Decoder 1354, which feeds the Regenerator 1355. This produces the Regenerated PCM 1356, which is the uncompressed Confirmation. Finally the Regenerated PCM 1356 is send back through the Telephone Network 1310 to the Client 1300 and Earphone 1304.

In the Prior Art of VAD, the Confirmation required about 64 kbits/sec. By contrast, this Embodiment uses about 3.25 kbits/sec. This greatly improves the required storage burden, data rate burden, Server hardware, and capital investment.

Voice-Activated Automated Business (VAAB)

The illustrative Embodiment for VAD is one example of Embodiments of this invention for Voice-Activated Automated Business (VAAB), especially across a communication network. For VAAB, it is often important to review the Speech and to verify the Recognized Text. Good practices may require Review and Verification both promptly and again much later. Thus it is important to have both good ASR and good V C. These can be advantageously provided by an Embodiment of this invention.

Generalization

This VAD scenario may be considered ASR, with audio review and audio correction, and with training driven by the User. In this Embodiment, this invention synergistically facilitates ASR, and facilitates VC of data for training and confirmation.

Weakly perceptive ASR may be adequate for VAD. Nevertheless, this Embodiment for VAD uses a Mel-Cepstrum Vector (Feature Vector) which is suitable for very perceptive ASR. This helps achieve VC with lifelike Regenerated PCM. A more luxurious system might include a Statistical Processor adequate for very perceptive -ASR, but used merely for weakly perceptive ASR.

This illustrative Embodiment for VAD facilitates VC of the data for audio training and audio confirmation. Audio confirmation may be considered an Embodiment of Review and Correction, using a specialized Text-To-Speech process, and using an audio Text Display.

What is claimed is:

1. A method for automatic speech recognition (ASR) and vocoding (VC), comprising the steps of:

converting a first signal representing speech to a second signal having raw mel capstrum vector (MCV) and a third signal having raw pitch;

subtracting a calibration vector from said MCV to form a difference vector;

multiplying a calibration matrix with said difference vector to produce a recalibrated MCV;

recalibrating said raw pitch with a logarithmic function;

concatenating said recalibrated MCV with said recalibrated pitch to form a recalibrated vector;

compressing and quantizing said recalibrated vector to form a vector quantized signal; and forwarding said vector quantized signal to a remote receiver for decoding said vector quantized signal received by the remote receiver to recover said speech.

2. The method according to claim 1, wherein said compressing and quantifying step includes slopes compression.

3. The method according to claim 1, wherein said compressing and quantifying step includes silence compression.

4. The method according to claim 1, wherein said step of compressing and quantifying includes use of a silence detector and a gate.

5. The method according to claim 1, wherein said step of compressing and quantifying includes duration compression.

6. The method according to claim 1, wherein said step of compressing and quantifying includes variable detail compression.

7. A method of decoding vector quantized data representing speech, comprising the steps of:

dequantizing and decompressing said vector quantized data including acoustic data substantially independent of phonemic information into a mel-capstrum vector (MCV), a recalibrated MCV, and pitch;

adding said MCV with a calibration vector;

statistically processing said sum vector into text; and regenerating said calibration MCV by frequency domain transformation into speech.

8. The method according to claim 7, wherein said decompressing step includes variable detail decompression.

9. The method according to claim 7, wherein said decompressing step includes duration decompression.

10. The method according to claim 7, wherein said decompressing step includes silence decompression.

11. The method according to claim 7, wherein said decompressing step includes slope decompression.

12. A program storage device having stored program instructions executable by a computer to perform method steps for automatic speech recognition (ASR) and vocoding (VC), the method steps comprising:

converting a first signal representing speech to a second signal having raw mel capstrum vector (MCV) and a third signal having raw pitch;

subtracting a calibration vector from said MCV to form a difference vector;

multiplying a calibration matrix with said difference vector to produce a recalibrated MCV;

recalibrating said raw pitch with a logarithmic function;

concatenating said recalibrated MCV with said recalibrated pitch to form a recalibrated vector;

compressing and quantizing said recalibrated vector to form a vector quantized signal; and forwarding said vector quantized signal to a remote receiver for decoding said vector quantized signal received by the remote receiver to recover said speech.

13. A program storage device having stored program instructions executable by a computer to perform method steps for decoding vector quantized data representing speech, the method comprising the steps of:

dequantizing and decompressing said vector quantized data into a mel-capstrum vector (MCV), a recalibrated MCV, and pitch;

adding said MCV with a calibration vector;

statistically processing said sum vector into text; and regenerating said calibration MCV by frequency domain transformation into speech.

* * * * *